(12) United States Patent
Schoedl

(10) Patent No.: US 10,789,414 B2
(45) Date of Patent: Sep. 29, 2020

(54) PATTERN-BASED FILLING OF A CANVAS WITH DATA AND FORMULA

(71) Applicant: think-cell Software GmbH, Berlin (DE)

(72) Inventor: Arno Schoedl, Berlin (DE)

(73) Assignee: Think-Cell Software GMBH, Berlin (DE)

( * ) Notice: Subject to any disclaimer, the term of this patent is extended or adjusted under 35 U.S.C. 154(b) by 232 days.

(21) Appl. No.: 15/971,641

(22) Filed: May 4, 2018

(65) Prior Publication Data
US 2019/0340219 A1   Nov. 7, 2019

(51) Int. Cl.
G06F 40/111 (2020.01)
G06F 3/0481 (2013.01)
G06F 40/18 (2020.01)

(52) U.S. Cl.
CPC .......... *G06F 40/111* (2020.01); *G06F 3/0481* (2013.01); *G06F 40/18* (2020.01)

(58) Field of Classification Search
None
See application file for complete search history.

(56) References Cited

U.S. PATENT DOCUMENTS

| | | | | |
|---|---|---|---|---|
| 2002/0103825 A1* | 8/2002 | Bauchot | .................. | G06F 40/18 715/220 |
| 2006/0167911 A1* | 7/2006 | Le Cam | .................. | G06F 40/18 |
| 2009/0319542 A1* | 12/2009 | Le Brazidec | ........... | G06F 40/18 |
| 2012/0303645 A1* | 11/2012 | Kulkarni-Puranik | ....................... | G06F 40/131 707/756 |
| 2013/0194297 A1 | 8/2013 | Theophil et al. | | |
| 2015/0169530 A1* | 6/2015 | Otero | .................... | G06F 40/274 715/219 |
| 2016/0055139 A1* | 2/2016 | Creason | .................. | G06F 40/18 715/217 |
| 2016/0378842 A1* | 12/2016 | Demonsant | ............. | G06F 40/18 707/602 |
| 2017/0124054 A1* | 5/2017 | Campbell | ............. | G06T 11/206 |
| 2018/0005122 A1* | 1/2018 | McDaid | ................... | G06N 5/04 |
| 2019/0042210 A1* | 2/2019 | Gaunt | .................. | G06N 3/0481 |
| 2019/0121847 A1* | 4/2019 | Castaneda-Villagran | .................... | G06F 40/186 |

* cited by examiner

*Primary Examiner* — Howard Cortes
(74) *Attorney, Agent, or Firm* — Harness, Dickey & Pierce, P.L.C.

(57) ABSTRACT

A computer implemented method includes receiving one or more data sequences and formula sequences, each formula referencing one or more of the data values of the data sequences; providing a GUI enabling a user to define a pattern including at least one data element representing a data sequence and at least one formula element representing a formula sequence, the GUI enabling the user to define the spatial relationship of the data elements and formula elements in the pattern, applying the pattern on a canvas of an electronic document multiple times, thereby filling canvas elements mapped to a data element with data values and filling canvas elements mapped to a formula element with formulas or formula results, until all data values of one of the data sequences or all formulas of one of the formula sequences have been filled once into the canvas.

24 Claims, 22 Drawing Sheets
(17 of 22 Drawing Sheet(s) Filed in Color)

| | A | B | C | D | E |
|---|---|---|---|---|---|
| 1 | 0.2241 | 0.4483 | | | |
| 2 | 0.6985 | 1.397 | | | |
| 3 | 0.1149 | 0.2299 | | | |
| 4 | 0.0262 | 0.0524 | | | |
| 5 | 0.052 | 0.104 | | | |
| 6 | 0.9623 | 1.9246 | | | |
| 7 | 0.5646 | 1.1292 | | | |
| 8 | 0.1583 | 0.3165 | | | |
| 9 | 0.4679 | 0.9358 | | | |
| 10 | 0.4166 | 0.8333 | | | |
| 11 | 0.0989 | 0.1977 | | | |
| 12 | 0.5204 | 1.0409 | | | |
| 13 | | | | | |

A1-A12: Data Sequence „$DS_{green}$"
B1-B12: Formula Sequence „$FS_{red}$"

|    | A       | B       | C | D | E |
|----|---------|---------|---|---|---|
| 1  | 0,2241  | 0,4483  |   |   |   |
| 2  | 0,6985  | 1,397   |   |   |   |
| 3  | 0,1149  | 0,2299  |   |   |   |
| 4  | 0,0262  | 0,0524  |   |   |   |
| 5  | 0,052   | 0,104   |   |   |   |
| 6  | 0,9623  | 1,9246  |   |   |   |
| 7  | 0,5646  | 1,1292  |   |   |   |
| 8  | 0,1583  | 0,3165  |   |   |   |
| 9  | 0,4679  | 0,9358  |   |   |   |
| 10 | 0,4166  | 0,8333  |   |   |   |
| 11 | 0,0989  | 0,1977  |   |   |   |
| 12 | 0,5204  | 1,0409  |   |   |   |
| 13 |         |         |   |   |   |

A1-A12: Data Sequence „$DS_{green}$"
B1-B12: Formula Sequence „$FS_{red}$"

Fig. 3a

|    | A                  | B      | C |
|----|--------------------|--------|---|
| 1  | 0,224141147833894  | =A1*2  |   |
| 2  | 0,698519056333244  | =A2*2  |   |
| 3  | 0,114931638387234  | =A3*2  |   |
| 4  | 0,0261985122134583 | =A4*2  |   |
| 5  | 0,0519818771042505 | =A5*2  |   |
| 6  | 0,962300235038519  | =A6*2  |   |
| 7  | 0,564603650526331  | =A7*2  |   |
| 8  | 0,158264275349788  | =A8*2  |   |
| 9  | 0,467896005987705  | =A9*2  |   |
| 10 | 0,416636022037131  | =A10*2 |   |
| 11 | 0,0988565847585315 | =A11*2 |   |
| 12 | 0,520441437962799  | =A12*2 |   |
| 13 |                    |        |   |

A1-A12: Data Sequence „$DS_{green}$"
B1-B12: Formula Sequence „$FS_{red}$"

Fig. 3b

| Data Sequence „DS$_{green}$" | Formula Sequence „FS$_{red}$" |
|---|---|
| 0,2241 | 0,4483 |
| 0,6985 | 1,397 |
| 0,1149 | 0,2299 |
| 0,0262 | 0,0524 |
| 0,052 | 0,104 |
| 0,9623 | 1,9246 |
| 0,5646 | 1,1292 |
| 0,1583 | 0,3165 |
| 0,4679 | 0,9358 |
| 0,4166 | 0,8333 |
| 0,0989 | 0,1977 |
| 0,5204 | 1,0409 |

Fig. 3c

| Data Sequence „DS$_{green}$" | Formula Sequence „FS$_{red}$" |
|---|---|
| 0,224141147833894 | =DS$_{green}$!1*2 |
| 0,698519056333244 | =DS$_{green}$!2*2 |
| 0,114931638387234 | =DS$_{green}$!3*2 |
| 0,026198512213458\3 | =DS$_{green}$!4*2 |
| 0,051981877104250\5 | =DS$_{green}$!5*2 |
| 0,962300235038519 | =DS$_{green}$!6*2 |
| 0,564603650526331 | =DS$_{green}$!7*2 |
| 0,158264275349788 | =DS$_{green}$!8*2 |
| 0,467896005987705 | =DS$_{green}$!9*2 |
| 0,416663022037131 | =DS$_{green}$!10*2 |
| 0,098856584758531\5 | =DS$_{green}$!11*2 |
| 0,520441437962799 | =DS$_{green}$!12*2 |

Fig. 3d

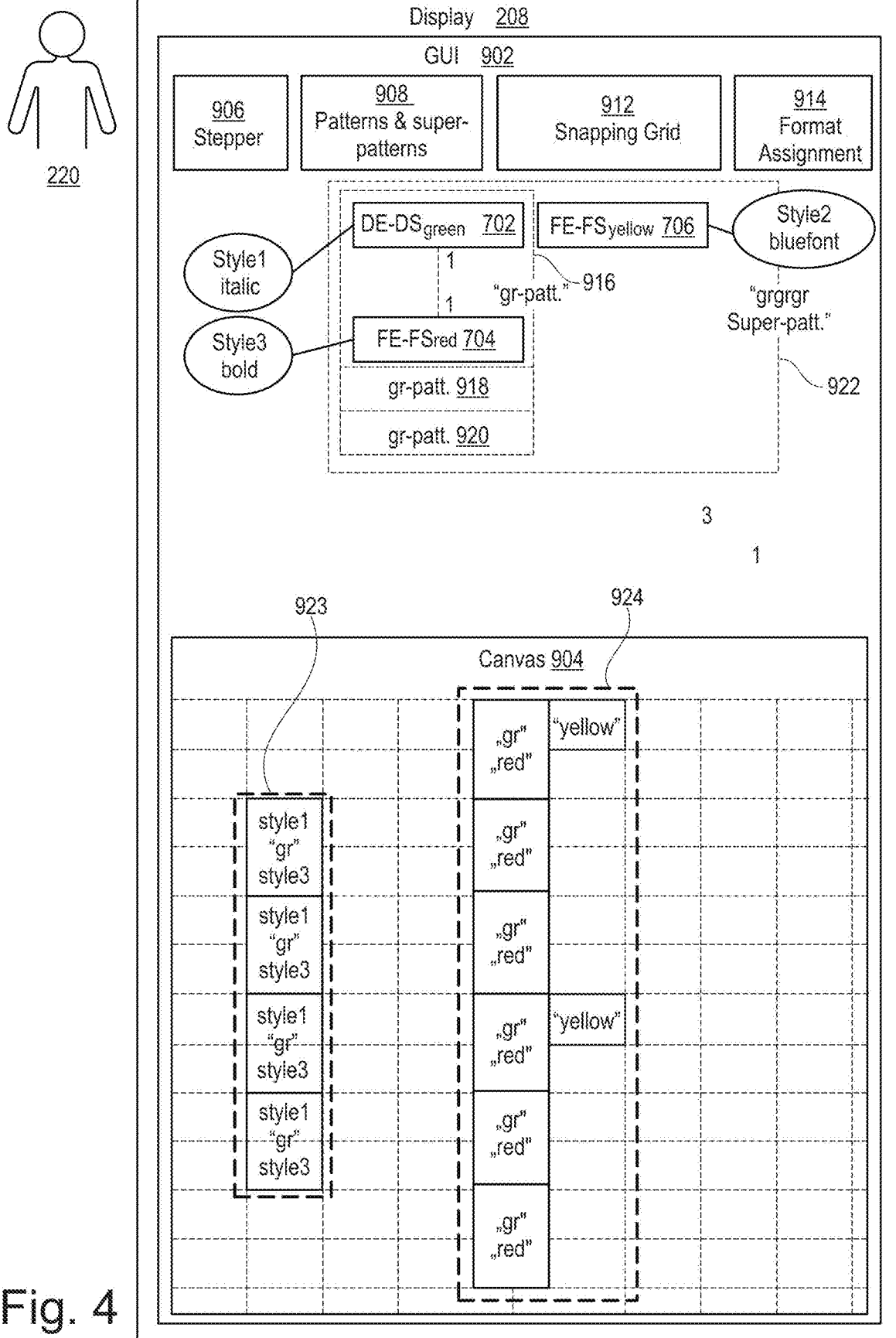

|   | A | B | C |
|---|---|---|---|
| 1 | 0,2241 | | |
| 2 | 0,4483 | | |
| 3 | 0,6985 | | |
| 4 | 1,397 | | |
| 5 | 0,1149 | | |
| 6 | 0,2299 | 2,0752 | |
| 7 | 0,0262 | | |
| 8 | 0,0524 | | |
| 9 | 0,052 | | |
| 10 | 0,104 | | |
| 11 | 0,9623 | | |
| 12 | 1,9246 | 2,081 | |
| 13 | 0,5646 | | |
| 14 | 1,1292 | | |
| 15 | 0,1583 | | |
| 16 | 0,3165 | | |
| 17 | 0,4679 | | |
| 18 | 0,9358 | 2,3815 | |
| 19 | 0,4166 | | |
| 20 | 0,8333 | | |
| 21 | 0,0989 | | |
| 22 | 0,1977 | | |
| 23 | 0,5204 | | |
| 24 | 1,0409 | | |

502

|   | A | B | C |
|---|---|---|---|
| 1 | 0,224141 | | |
| 2 | 0,448282 | | |
| 3 | 0,698519 | | |
| 4 | 1,397038 | | |
| 5 | 0,114932 | | |
| 6 | 0,229863 | 2,0752 | |
| 7 | 0,026199 | | |
| 8 | 0,052397 | | |
| 9 | 0,051982 | | |
| 10 | 0,103964 | | |
| 11 | 0,9623 | | |
| 12 | 1,9246 | 2,081 | |
| 13 | 0,564604 | | |
| 14 | 1,129207 | | |
| 15 | 0,158264 | | |
| 16 | 0,316529 | | |
| 17 | 0,467896 | | |
| 18 | 0,935792 | 2,3815 | |
| 19 | 0,416636 | | |
| 20 | 0,833272 | | |
| 21 | 0,098857 | | |
| 22 | 0,197713 | | |
| 23 | 0,520441 | | |
| 24 | 1,040883 | 2,0719 | |

504

4th pattern application →

Fig. 6a

| | A | B |
|---|---|---|
| 1 | 0.224141147833894 | |
| 2 | =A1*2 | |
| 3 | 0.698519056333244 | |
| 4 | =A3*2 | |
| 5 | 0.114931638387234 | |
| 6 | =A5*2 | =A2+A4+A6 |
| 7 | 0.0261985122134583 | |
| 8 | =A7*2 | |
| 9 | 0.0519818771042505 | |
| 10 | =A9*2 | |
| 11 | 0.962300235038519 | |
| 12 | =A11*2 | =A8+A10+A12 |
| 13 | 0.564603650526331 | |
| 14 | =A13*2 | |
| 15 | 0.158264275349788 | |
| 16 | =A15*2 | |
| 17 | 0.467896005987705 | |
| 18 | =A17*2 | =A14+A16+A18 |
| 19 | 0.416636022037131 | |
| 20 | =A19*2 | |
| 21 | 0.0988565847585315 | |
| 22 | =A21*2 | |
| 23 | 0.520441437962799 | |
| 24 | =A23*2 | |
| 25 | | |

506

4th pattern application →

| | A | B |
|---|---|---|
| 1 | 0.224141147833894 | |
| 2 | =A1*2 | |
| 3 | 0.698519056333244 | |
| 4 | =A3*2 | |
| 5 | 0.114931638387234 | |
| 6 | =A5*2 | =A2+A4+A6 |
| 7 | 0.0261985122134583 | |
| 8 | =A7*2 | |
| 9 | 0.0519818771042505 | |
| 10 | =A9*2 | |
| 11 | 0.962300235038519 | |
| 12 | =A11*2 | =A8+A10+A12 |
| 13 | 0.564603650526331 | |
| 14 | =A13*2 | |
| 15 | 0.158264275349788 | |
| 16 | =A15*2 | |
| 17 | 0.467896005987705 | |
| 18 | =A17*2 | =A14+A16+A18 |
| 19 | 0.416636022037131 | |
| 20 | =A19*2 | |
| 21 | 0.0988565847585315 | |
| 22 | =A21*2 | |
| 23 | 0.520441437962799 | |
| 24 | =A23*2 | =A20+A22+A24 |
| 25 | | |

Worksheet of Prior Art Speadsheet Application

| | A | B |
|---|---|---|
| 1 | 0,2241 | 2,0752 |
| 2 | 0,4483 | 2,081 |
| 3 | 0,6985 | 2,3815 |
| 4 | 1,397 | 2,0719 |
| 5 | 0,1149 | NO! Copy-paste |
| 6 | 0,2299 | |
| 7 | 0,0262 | |
| 8 | 0,0524 | |
| 9 | 0,052 | |
| 10 | 0,104 | |
| 11 | 0,9623 | |
| 12 | 1,9246 | |
| 13 | 0,5646 | |
| 14 | 1,1292 | |
| 15 | 0,1583 | |
| 16 | 0,3165 | |
| 17 | 0,4679 | |
| 18 | 0,9358 | |
| 19 | 0,4166 | |
| 20 | 0,8333 | |
| 21 | 0,0989 | |
| 22 | 0,1977 | |
| 23 | 0,5204 | |
| 24 | 1,0409 | |
| 25 | | |

Fig. 7a

| | A | B |
|---|---|---|
| 1 | 0,224141147833894 | =A2+A4+A6 |
| 2 | =A1*2 | =A8+A10+A12 |
| 3 | 0,698519056333244 | =A14+A16+A18 |
| 4 | =A3*2 | =A20+A22+A24 |
| 5 | 0,114931638387234 | NO! Copy-paste |
| 6 | =A5*2 | |
| 7 | 0,0261985122134583 | |
| 8 | =A7*2 | |
| 9 | 0,0519818771042505 | |
| 10 | =A9*2 | |
| 11 | 0,962300235038519 | |
| 12 | =A11*2 | |
| 13 | 0,564603650526331 | |
| 14 | =A13*2 | |
| 15 | 0,158264275349788 | |
| 16 | =A15*2 | |
| 17 | 0,467896005987705 | |
| 18 | =A17*2 | |
| 19 | 0,416636022037131 | |
| 20 | =A19*2 | |
| 21 | 0,0988565847585315 | |
| 22 | =A21*2 | |
| 23 | 0,520441437962799 | |
| 24 | =A23*2 | |
| 25 | | |

Fig. 7b

Auto-Fill Function for Generating a Formula Sequence

Auto-Fill Function for Generating a Formula Sequence

| | A | B |
|---|---|---|
| 1 | 0.224141147833894 | =FS$_{red}$!1+FS$_{red}$!2+FS$_{red}$!3 |
| 2 | =DS$_{green}$!1*2 | =FS$_{red}$!4+FS$_{red}$!5+FS$_{red}$!6 |
| 3 | 0.698519056333244 | |
| 4 | =DS$_{green}$!2*2 | |
| 5 | 0.114931638387234 | |
| 6 | =DS$_{green}$!3*2 | |
| 7 | 0.026198512213458 | |
| 8 | =DS$_{green}$!4*2 | |
| 9 | 0.051981877104250 | |
| 10 | =DS$_{green}$!5*2 | |
| 11 | 0.962300235038519 | |
| 12 | =DS$_{green}$!6*2 | |
| 13 | 0.564603650526331 | |
| 14 | =DS$_{green}$!7*2 | |
| 15 | 0.158264275349788 | |
| 16 | =DS$_{green}$!8*2 | |
| 17 | 0.467896005987705 | |
| 18 | =DS$_{green}$!9*2 | |
| 19 | 0.416636022037131 | |
| 20 | =DS$_{green}$!10*2 | |
| 21 | 0.098856584758531 | |
| 22 | =DS$_{green}$!11*2 | |
| 23 | 0.520441437962799 | |
| 24 | =DS$_{green}$!12*2 | |
| 25 | | |

Fig. 8c

| | A | B |
|---|---|---|
| 1 | 0.224141147833894 | =FS$_{red}$!1+FS$_{red}$!2+FS$_{red}$!3 |
| 2 | =DS$_{green}$!1*2 | =FS$_{red}$!4+FS$_{red}$!5+FS$_{red}$!6 |
| 3 | 0.698519056333244 | =FS$_{red}$!7+FS$_{red}$!8+FS$_{red}$!9 |
| 4 | =DS$_{green}$!2*2 | |
| 5 | 0.114931638387234 | |
| 6 | =DS$_{green}$!3*2 | |
| 7 | 0.026198512213458 | |
| 8 | =DS$_{green}$!4*2 | |
| 9 | 0.051981877104250 | |
| 10 | =DS$_{green}$!5*2 | |
| 11 | 0.962300235038519 | |
| 12 | =DS$_{green}$!6*2 | |
| 13 | 0.564603650526331 | |
| 14 | =DS$_{green}$!7*2 | |
| 15 | 0.158264275349788 | |
| 16 | =DS$_{green}$!8*2 | |
| 17 | 0.467896005987705 | |
| 18 | =DS$_{green}$!9*2 | |
| 19 | 0.416636022037131 | |
| 20 | =DS$_{green}$!10*2 | |
| 21 | 0.098856584758531 | |
| 22 | =DS$_{green}$!11*2 | |
| 23 | 0.520441437962799 | |
| 24 | =DS$_{green}$!12*2 | |
| 25 | | |

Fig. 8d

|   | A | B | C | D | E | F |
|---|---|---|---|---|---|---|
| 1 | 0.224141148 | 0.2345346 | =DS₂Dgreen!A1*2 | =DS₂Dgreen!B1*2 | =FS₂Dred!SUM(A1:A3) | |
| 2 | 0.698519056 | | =DS₂Dgreen!A2*2 | | =FS₂Dred!SUM(A4:A6) | |
| 3 | 0.114931638 | | | | | |
| 4 | 0.026198512 | | | | | |
| 5 | 0.051981877 | | | | | |
| 6 | 0.962300235 | | | | | |
| 7 | 0.564603651 | | | | | |
| 8 | 0.158264275 | | | | | |
| 9 | 0.467896006 | | | | | |
| 10 | 0.416636022 | | | | | |
| 11 | 0.098856585 | | | | | |
| 12 | 0.520441438 | | | | | |
| 13 | | | | | | |

702 Block "DS₂Dgreen"
704 Block "FS₂Dred"
706 Block "FS_yellow"

Fig. 9

1. Import 'Revenue' and 'Cost' data sequence &
2. Define 'Profit' formula sequence and enter its first formula

| | A | B | C | D | E | F |
|---|---|---|---|---|---|---|
| | | Revenue | | Cost | | Profit |
| 19 | | | | | | |
| 20 | | | | | | |
| 21 | | 4 | | 4 | | =Revenue!1-Cost!1 |
| 22 | | 5 | | 4 | | |
| 23 | | 4 | | 5 | | |
| 24 | | 6 | | 4 | | |
| 25 | | 5 | | 5 | | |
| 26 | | 6 | | 6 | | |
| 27 | | 9 | | 5 | | |
| 28 | | 5 | | 4 | | |
| 29 | | 8 | | 2 | | |
| 30 | | 6 | | 3 | | |
| 31 | | 8 | | 3 | | |
| 32 | | 9 | | 6 | | |
| 33 | | | | | | |
| 34 | | | | | | |
| 35 | | | | | | |

Fig. 11a

3. Fill in references of second formula, which triggers extrapolation

| Revenue | Cost | Profit |
|---|---|---|
| 4 | 4 | =Revenue!1-Cost!1 |
| 5 | 4 | =Revenue!2-Cost!2 |
| 4 | 5 | =Revenue!3-Cost!3 |
| 6 | 4 | =Revenue!4-Cost!4 |
| 5 | 5 | =Revenue!5-Cost!5 |
| 6 | 6 | =Revenue!6-Cost!6 |
| 9 | 5 | =Revenue!7-Cost!7 |
| 5 | 4 | =Revenue!8-Cost!8 |
| 8 | 2 | =Revenue!9-Cost!9 |
| 6 | 3 | =Revenue!10-Cost!10 |
| 8 | 3 | =Revenue!11-Cost!11 |
| 9 | 6 | =Revenue!12-Cost!12 |

Fig. 11b

4. Switch to result view

| Revenue | Cost | Profit |
|---|---|---|
| 4 | 4 | 0 |
| 5 | 4 | 1 |
| 4 | 5 | -1 |
| 6 | 4 | 2 |
| 5 | 5 | 0 |
| 6 | 6 | 0 |
| 9 | 5 | 4 |
| 5 | 4 | 1 |
| 8 | 2 | 6 |
| 6 | 3 | 3 |
| 8 | 3 | 5 |
| 9 | 6 | 3 |

Fig. 11c

5. Switch to formula view and define 'Aggregated' formula sequence and enter its first formula

| Revenue | Cost | Profit | Aggregated |
|---|---|---|---|
| 4 | 4 | =Revenue!1-Cost!1 | =SUM(Profit!1:Profit!3) |
| 5 | 4 | =Revenue!2-Cost!2 | |
| 4 | 5 | =Revenue!3-Cost!3 | |
| 6 | 4 | =Revenue!4-Cost!4 | |
| 5 | 5 | =Revenue!5-Cost!5 | |
| 6 | 6 | =Revenue!6-Cost!6 | |
| 9 | 5 | =Revenue!7-Cost!7 | |
| 5 | 4 | =Revenue!8-Cost!8 | |
| 8 | 2 | =Revenue!9-Cost!9 | |
| 6 | 3 | =Revenue!10-Cost!10 | |
| 8 | 3 | =Revenue!11-Cost!11 | |
| 9 | 6 | =Revenue!12-Cost!12 | |

Fig. 11d

6. Fill in references of second formula, which triggers extrapolation

| Revenue | Cost | Profit | Aggregated |
|---|---|---|---|
| 4 | 4 | =Revenue!1-Cost!1 | =SUM(Profit!1:Profit!3) |
| 5 | 4 | =Revenue!2-Cost!2 | =SUM(Profit!4:Profit!6) |
| 4 | 5 | =Revenue!3-Cost!3 | =SUM(Profit!7:Profit!9) |
| 6 | 4 | =Revenue!4-Cost!4 | =SUM(Profit!10:Profit!12) |
| 5 | 5 | =Revenue!5-Cost!5 | |
| 6 | 6 | =Revenue!6-Cost!6 | |
| 9 | 5 | =Revenue!7-Cost!7 | |
| 5 | 4 | =Revenue!8-Cost!8 | |
| 8 | 2 | =Revenue!9-Cost!9 | |
| 6 | 3 | =Revenue!10-Cost!10 | |
| 8 | 3 | =Revenue!11-Cost!11 | |
| 9 | 6 | =Revenue!12-Cost!12 | |

Fig. 11e

7. Switch to result view

| Revenue | Cost | Profit | Aggregated |
|---|---|---|---|
| 4 | 4 | 0 | 0 |
| 5 | 4 | 1 | 2 |
| 4 | 5 | -1 | 11 |
| 6 | 4 | 2 | 11 |
| 5 | 5 | 0 | |
| 6 | 6 | 0 | |
| 9 | 5 | 4 | |
| 5 | 4 | 1 | |
| 8 | 2 | 6 | |
| 6 | 3 | 3 | |
| 8 | 3 | 5 | |
| 9 | 6 | 3 | |

Fig. 11f

9. Drag the first yellow box udnerneath the first red box, thereby modifying the pattern sequence to 'Revenue|Cost|Profit'

PATTERN-BASED FILLING OF A CANVAS WITH DATA AND FORMULA

FIELD OF THE INVENTION

The invention relates to the field of data processing, and more particularly to the processing and presentation of data and formulas in a canvas of an electronic document.

BACKGROUND AND RELATED ART

The entering of long lists of data values and formulas in office applications such as Microsoft Excel is a time consuming and error prone task. Some advanced office applications, e.g. Excel, already come with some functions that ease the entering and/or processing of long lists of data values and formulas. For example, it is possible to enter long data and formula lists via the clipboard from several different source applications and it is possible to automatically extrapolate some data value series via built-in Excel functions, e.g. completing a partial, consecutive list of numbers or dates via Excel's fill handle or the Series command. To extend complex and nonlinear data, regression analysis functions can be applied that may be provided by the office program itself or by an add-in of the office application program or by a separate application program.

However, in particular in respect to the entering and processing of formulas, there are still several technical constraints that may render the entering and/or use of formulas in office applications an error prone and time consuming task.

For example, long lists of formulas currently have to be entered into many spreadsheet applications manually. There are only limited options to copy-paste lists of formulas into a canvas of an electronic document in many state of the art office applications and often the references to the source data are not updated. In some state of the art applications such as Excel, it is possible to copy-paste some formulas from a source cell of a worksheet to a target cell of the same or another worksheet, whereby the references specified in the formulas are automatically updated such that the updated references of the formula filled into the target cell reflect the x- and y-offset of the source cell and the target cell. However, in case a particular formula needs to be copied multiple times into a series of target cells whose respective target-cell-to-target-cell offset differs from the offset of the data values referenced by the formula in the source cell, the copy process will generate erroneous formula copies. Thus, in a first aspect, some state-of-the-art spreadsheet applications are unsuited for specifying or handling long formula sequences.

Moreover, in case a formula references one or more data source cells and the relative position of the cells is modified by a user, e.g. by inserting additional rows or columns, the reference(s) in the formula may not be updated automatically. In particular in case a formula references multiple source data cells, these references may not be updated correctly upon a rearrangement of cells in the document. Thus, in a second aspect, state of the art spreadsheet applications are inflexible because their capabilities to automatically update references in formulas are limited.

Furthermore, the pattern of data and formula cells resulting from multiple copy-paste operations is highly inflexible, because modifications in the relative position of (formula) cells need to be performed manually for each set of cells inserted in a copy-paste operation. Thus, the cell pattern obtained by manually copying sets of interdependent formula cells is hampered by massive code duplication and soon reaches a complexity that prohibits manual maintenance and update of formulas: any modification to the original formula may need to be copy-pasted multiple times for propagating the formula modification to all formula instances in the electronic document created in a manual copy-paste process. Thus, in a third aspect, state-of-the-art spreadsheet applications do not support managing complex, repetitive formula patterns as they require the user to generate multiple copies of a given code that respectively needs to be maintained manually.

To give a concrete example, a spreadsheet may comprise a cell matrix wherein three subsequent formula cells (M1, M2, M3) in a column compute a numerical data value for January, February and March, respectively. The fourth cell (Q1) in said column comprises a different formula for computing a derivative value for the first quarter of the year which references cells M1, M2 and M3. Further three subsequent formula cells (M4, M5, M6) in said column compute a numerical data value for April, May, and June, respectively. The eighth cell (Q2) in said column comprises a formula for computing a derivative value for the second quarter of the year which references cells M4, M5 and M6. Further three subsequent formula cells (M7, M8, M9) in said column compute a numerical data value for July, August and September, respectively. The twelfth cell (Q3) in said column comprises a formula for computing a derivative value for the third quarter of the year which references cells M7, M8 and M9. And so on. The $16^{th}$ cell (Q4) comprises a formula for computing the derivative value of the fourth quarter of the year. Now a user may wish to modify the way the derivative value is computed for each quarter such that one or more additional cells (and rows) need to be inserted between the formulas for the respective month (e.g. M1-M3) and the formula cell for the respective quarter (e.g. Q1). However, in case the user introduces such additional rows manually, e.g. between the row comprising M3 and the row comprising Q1, the user does not only have to update the formula in cell Q1 for computing the derivative value for the first quarter, the user in addition has to manually insert the rows between M6 and Q2 and between M9 and Q1 and between M12 and Q4, respectively, because the change in the relative position of formulas and data values in the cells comprising the data values and formulas for Q1 is not automatically propagated to the cells comprising the data values and formulas for Q2, Q3 and Q4. In addition, he or she has to update the references in the formula cells Q1, Q2, Q3 and Q4 after the three additional rows were added manually as the references are not automatically updated. As can be easily inferred from this simple example, the cell pattern generated by copy-pasting complex interdependent data-formula cell matrices leads to code duplication that does not allow to modify the spatial relationship between data cells and formula cells at reasonable expense in case the number of copy-paste operations exceeds three or four.

Thus, the re-use of already defined formulas in current spreadsheet applications is limited to some few use case scenarios with very simple data value and formula relationships. However, in most real-world use case scenarios, users may wish to arrange the formulas freely without being limited by the location and arrangement of data value cells referenced by the formula.

SUMMARY

Embodiments of the invention provide for an improved method, computer program product and system for controlling the processing of data in an electronic document.

In a further aspect, embodiments of the invention provide for a method, computer program product and system for automatically extrapolating formulas. Corresponding methods, computer program products and computer systems are specified in the independent and dependent claims. Embodiments of the present invention can freely be combined with each other if they are not mutually exclusive.

In one aspect, the invention relates to a computer-implemented method of data processing control. The method comprises:
- receiving one or more data sequences, each data sequence being a sequence of one or more data values;
- receiving one or more formula sequences, each formula sequence being a sequence of one or more formulas, each formula comprising one or more references to one or more of the data values of one or more of the data sequences and comprising one or more operators which specify how the referenced data values are to be processed;
- providing a GUI, the GUI enabling a user to define a pattern comprising at least one data element and at least one formula element, each data element representing one of the data sequences and each formula element representing one of the formula sequences, the GUI enabling the user to define the spatial relationship of the data elements and formula elements in the pattern,
- applying the pattern on a canvas of an electronic document a first time, the application comprising:
  - mapping the data elements and formula elements of the pattern to elements of the canvas;
  - filling each of the canvas elements mapped to a data element with the data value of the data sequence represented by said data element,
  - filling each of the canvas elements mapped to a formula element with one of the formulas of the formula sequence represented by said formula element or with a result value computed by applying the formula to the one or more data values referenced by said formula;
- repeatedly applying the pattern on the canvas, thereby mapping the elements of the pattern to further elements of the canvas and filling the further elements of the canvas with further ones of the data values of the one or more data sequences and with further ones of the formulas of the one or more formula sequences or their results until all data values of one of the data sequences or all formulas of one of the formula sequences have been filled once into the canvas.

Said features may be advantageous because a non-abstract improvement of computer functionality is achieved: current canvas-based applications, e.g. spreadsheet applications, do not allow defining and maintaining highly complex, repetitive, formula-based calculations in an error-robust, easy manner. The definition of such formulas in state of the art canvas-based applications is time-consuming and error-prone. Embodiments of the invention may overcome these problems by modifying and enhancing the way how data and formula elements and their format is handled in a canvas-based application. Embodiments of the invention may enable a user to freely define the spatial relationships of data elements and formula elements and transfer these relationships in the pattern application step on the canvas irrespective of the references in the formulas of the formula sequence(s), referencing other formulas or data values. Moreover, the user needs to define the pattern only once and does not have to perform multiple manual copy-paste actions for copy-pasting formulas and/or data values from and to a canvas of an electronic document. Thus, errors resulting from erroneous automated formula reference updates and errors resulting from manual data input can be avoided. Moreover, as the canvas is automatically filled with data values and formulas in accordance with the user-defined pattern, the pattern may be reused on many different but semantically equivalent data sequences, e.g. measurement data obtained from many different objects of the same object type. In a further advantageous aspect, highly complex spatial relationships of multiple formula sequences and multiple data sequences may be defined once via a GUI in the form of a pattern which can then be used repeatedly for automatically filling the canvas with as many pattern instances (and respective formulas and data values) as can be generated from the number of data values and formulas contained in the received data sequences and formula sequences. Depending on the use case scenario, the pattern may be applied multiple 100, 1000, 10,000 or more times.

According to embodiments, the GUI enables a user to select a block of the canvas comprising multiple data values and formulas which have been introduced into the canvas e.g. by applying a pattern on the canvas multiple times. For example, the GUI may enable the user to select a matrix of canvas elements comprising one or more columns and one or more rows and assign an identifier to the block, thereby configuring the program logic of the GUI such that the content of the canvas elements of the selected block are used as a pattern sequence that can be represented by an element of a super-pattern. The same principle applies to the generation of any higher level pattern sequences, e.g. super-super-pattern sequences, super-super-super-pattern sequences, and so on.

Providing a GUI that enables a user to specify patterns of many hierarchical orders (e.g. patterns on the first level, super-patterns on a second level, super-super-patterns on a third level) may be advantageous as a user may be enabled to specify highly complex arrangements of data elements, formula elements and pattern elements hierarchically in a semi-automated, highly flexible manner that avoids code duplication and the manual entry or definition of repetitive formula dependencies. Moreover, user may specify the spatial relationship of all elements in the pattern irrespective of the offset of the data values in the canvas or in another data source referenced by the respective formulas. Thus, a highly flexible way of specifying recursive functions in office applications such as Microsoft Excel based on nested formulas may be provided.

In addition, or alternatively, the method according to embodiments of the invention further comprises automatically or semi-automatically identifying one or more data sequences and/or one or more formula sequences in a selected canvas region, e.g. in a selected block of canvas elements comprising one or more data values and one or more formulas referencing the one or more data values.

According to some examples, the GUI may comprise a GUI element, e.g. a frame that can be dropped or created as an overlay of a canvas of an electronic document, for selecting cells or blocks of cells and for using their content as a data sequence and/or formula sequence. For example, adjacent cells covered by the frame which comprise data values can be used as a data sequence and adjacent cells covered by the frame which comprise formulas can be used as a formula sequence. Alternatively, the user may be enabled to select a block of canvas elements with a pointing device, e.g. a mouse. Then, the canvas elements of the selected block are analyzed to identify elements comprising data values, which are represented as data sequences, and to identify canvas elements comprising formulas, which are represented as formula sequences. In some embodiments, the user is enabled to assign an ID to each identified data sequence and/or formula sequence. For example, the user may assign the ID via a context menu that is displayed upon a user action, e.g. the user clicking the right mouse button on a cell block identified to comprise a data sequence or formula sequence. Thereby, the addresses of the data values may be transformed from a canvas-coordinate-system based address into an address consisting of a combination of a sequence-ID and an offset information. The format of the individual canvas elements such as font color, type and size, background color and the like may be used as the format assigned to the element of the pattern generated for representing said data sequence/formula sequence.

According to embodiments, the GUI that enables the user to define a pattern is configured such that the user is allowed to select a canvas element within a block of canvas cells that represents a first sequence and to drop the selected canvas element in the neighborhood of another block of canvas elements that represents a second sequence. A drag&drop operation on a canvas element as used herein implies that the content and preferably also the format of the moved canvas element is completely moved from an original position in the canvas to the target position in the canvas. The first sequence can be a data sequence, a formula sequence or a pre-defined pattern sequence. Likewise, the second sequence can be a data sequence, a formula sequence or a pre-defined pattern sequence. The "neighborhood" of the other block of canvas elements comprises at least the canvas elements directly adjacent to the other block of canvas elements, but may in some embodiments also comprise canvas elements which are one or more canvas elements away from the other block. The size of the canvas area around a canvas element block that is considered as "neighborhood" of the block may be pre-configured in the GUI or may be defined by the user. In response to the user having dropped one element of the first sequence onto a particular region in the neighborhood of the second block, all elements of the second cell block are re-arranged in accordance with one or more element alignment rules.

An element alignment rule AR1 may indicate that if a particular canvas element CEA representing a particular position within a first sequence is dropped with a particular x and y distance from its nearest canvas element CEB in another block representing another sequence, then all canvas elements representing "downstream" elements of this particular canvas element CEA shall be moved to positions in said "neighborhood" having the same x and y distance from the respective canvas elements in the other block downstream to CEB. For example, a canvas element CEA1 may represent the first position within the first sequence and may be dropped onto position P1 4 canvas elements above and 5 canvas elements left of another canvas element CEB1, whereby the canvas element CEB1 represents the first position within the second sequence. In response to the drag&drop operation of CEA1 onto position P1, a canvas element CEA2 representing the second position within the first sequence is automatically moved to position P2 which is 4 canvas elements above and 5 canvas elements left of another canvas element CEB2, whereby the canvas element CEB2 represents the second position within the second sequence, and so on until all canvas elements representing an element of the first sequence have been moved to a respective position in the neighborhood of the second block of cells. In this case, the drag & drop operation of the user represents a pattern definition step and all subsequent steps of moving "downstream" canvas elements to respective target position represents a "pattern application" operation.

The output generated by a given pattern may be used as input of a higher-order pattern referred herein as super-pattern. Thus, highly complex, nested relationships of multiple formulas and respective formula sequences may be specified in an efficient, flexible and error-robust manner without any manual copy-paste action on formulas or data values.

Said features may be advantageous, as the program logic providing the GUI may enable a user to define a pattern in a canvas intuitively via one or more drag&drop operations, whereby the pattern created by the drag&drop operation is immediately and fully automatically applied on the same canvas within which the pattern was created. Hence, the pattern can be created directly in the canvas without the use of an extra GUI providing a pattern design environment. For example, a spreadsheet application or a plug-in or add-on of said application may enable a user to create worksheets or define regions within a worksheet wherein any rearrangement of canvas elements in a drag&drop operation is automatically interpreted as a pattern definition step and wherein the created pattern is immediately applied onto other cells of the canvas.

According to embodiments, the generation of the pattern comprises performing, by the user, a drag-and-drop operation of the data element or the formula element for positioning the data element and the formula element at desired positions relative to each other.

According to embodiments, the GUI and the canvas of the electronic document are separate graphical user interfaces. For example, the GUI can be a pop-up window or an additional dialog window generated by the program logic implementing the method according to embodiments of the invention. The pop-up window can be displayed on top of or instead of the canvas comprising the input data and formula sequences and/or comprising the pattern instances generated by applying the pattern on the canvas multiple times.

According to embodiments, the GUI that enables the user to define the pattern is the canvas of the electronic document or a selected region of the canvas of the electronic document. The at least one data element representing the data sequence in the pattern is a canvas element comprising the first data value of the data sequence. The at least one formula element representing the formula sequence in the pattern is a canvas element comprising the first formula of the formula sequence.

These features may be advantageous, as the user does not have to open and/or become familiar with an additional window. Rather, the user may simply use spreadsheet cells comprising the first elements of respective data and formula sequences as GUI elements representing the respective sequence. By re-arranging said cells with the first sequence elements, the user may trigger the automated (re-) definition of a pattern and the automated application of the (re-)defined pattern on the canvas multiple times in a highly efficient and intuitive manner.

According to embodiments, the GUI receives a pattern sequence as input. For example, the pattern sequence may be provided in the form of a file, a list of manually specified or automatically created database records or may be provided by a user by selecting cell blocks of a canvas as described above. In some embodiments, the program logic enables the user, e.g. via a selectable GUI element, to select a region of the canvas that comprises a list of pattern instances created in the canvas upon applying an already defined pattern on the canvas. The received pattern sequence comprises the pattern. A further possible embodiment is described herein with reference to FIG. 11.

According to embodiments, the GUI enables the user to define a super-pattern. The super-pattern comprises at least one pattern element representing the pattern sequence and comprises at least one data element and/or formula element. The GUI enables the user to define the spatial relationship of the pattern element and the data element(s) and/or formula element(s) in the super-pattern.

For example, the super-pattern may consist of the pattern and n data elements, n being an integer larger than zero. Alternatively, the super-pattern may consist of the pattern and m formula elements, m being an integer larger than zero. Still alternatively, the super-pattern may consist of the pattern, n data elements and m formula elements which are spatially arranged relative to each other via the GUI by a user. According to other examples, the super-pattern comprises multiple patterns and one or more data and/or formula elements.

According to embodiments, the method further comprises applying the super-pattern on a further canvas of the electronic document a first time. The application comprises:

mapping the data elements and formula elements of the super-pattern, including the data elements and formula elements of the pattern, to elements of the further canvas;

filling each of said canvas elements mapped to a data element with the data value of the data sequence represented by said data element, filling each of said canvas elements mapped to a formula element with one of the formulas of the formula sequence represented by said formula element or with a result value computed by applying the formula to the one or more data values referenced by said formula;

The further canvas can be, for example, a further worksheet of a spreadsheet application, or a further region within the worksheet of the spreadsheet application that already comprises the applied pattern.

Then, the method comprises repeatedly applying the super-pattern on the further canvas, thereby mapping the elements of the super-pattern, including the elements of the pattern, to further elements of the further canvas and filling the further elements of the canvas with further ones of the data values of the one or more data sequences and with further ones of the formulas of the one or more formula sequences or their results until all data values of one of the data sequences or all formulas of one of the formula sequences have been filled once into the further canvas. For example, the further canvas can be a further worksheet of the same electronic document that already comprises the canvas on which the pattern was applied, or can be a worksheet of a different electronic document. In the latter case, the references of the formulas are preferably specified such that an identification of the respective electronic document comprising the data values and/or formulas of the data sequences and formula sequences is possible.

According to some embodiments, the method comprises computing, for each canvas element in the further canvas that was mapped to a formula element, a result value by applying the formula filled into said formula element on the one or more data values referenced by said formula. The computed formula result value is stored in association with the data values and the formula used for computing the result value in a storage medium. Depending on the embodiment, the formula or the formula result or another visual object is displayed in the canvas element to which a formula element was mapped.

According to embodiments, the GUI comprises GUI elements enabling the user to define super-patterns comprising multiple pattern elements, whereby each pattern element respectively represents a pattern sequence. The definition of the super-pattern comprises defining the spatial relationship of pattern elements and of data elements and formula elements, if any, within the super-pattern.

For example, the definition of the super-pattern may comprise defining the spatial relationship of two or more pattern elements to each other and/or may comprise defining the spatial relationship of two or more pattern elements and formula elements with each other and/or may comprise defining the spatial relationship of two or more pattern elements and data elements with each other and/or may comprise defining the spatial relationship of two or more data elements and formula elements with each other.

According to embodiments, the GUI comprises GUI elements enabling the user to define a super-super-pattern. The super-super-pattern comprises at least one super-pattern element representing a super-pattern sequence. The definition of the super-super-pattern comprises defining the spatial relationship of the at least one super-pattern element and of pattern elements, data elements and formula elements, if any, within the super-super-pattern.

According to embodiments, the canvas of the electronic document is a worksheet of a spreadsheet application or a sub-region thereof or a slide of a presentation application. For example, the canvas can be a worksheet of a spreadsheet application like MS Excel and each individual canvas elements can be a single spreadsheet cell or a collection of multiple merged spreadsheet cells.

This may be advantageous as spreadsheet applications and presentation applications are frequently used for specifying and/or working with long lists of data values and complex, often nested lists of formulas referencing data values and other formulas. By providing program logic and a GUI enabling a user to define and apply a pattern as described herein for embodiments of the invention, existing office programs may be used more effectively when entering or processing long lists of data values and formulas.

According to embodiments, the method further comprises, before performing the filling of the canvas elements:

automatically predicting the number of times the pattern will be applied given the length of the one or more data sequences and the length of the one or more formula sequences; in case a super-pattern is to be applied repeatedly on the canvas, the length of the pattern sequence(s) is also evaluated for predicting the number of times the super-pattern can be applied on the canvas until all patterns in the pattern sequence have been "used"/"applied" once on the canvas;

using the predicted number and the size and shape of the pattern as input for automatically identifying all elements in the canvas that will be mapped to pattern elements of the pattern after having applied the pattern the predicted number of times; and outputting a warning message that data might be lost in case the identified elements in the canvas already comprise other content and/or locking the identified elements in the canvas such that manual editing of the identified elements is prohibited.

For example, if the pattern comprises 9 elements altogether and has a height of four elements, it will "consume" (fill) 40 canvas rows if it is applied 10 times on the canvas;

another pattern that also comprises 9 elements but is only two elements high will consume only 20 canvas rows when applied 10 times;

According to embodiments, the GUI comprises GUI elements enabling a user to assign a respective cell format to each of the data elements and formula elements of the pattern. The GUI is configured for assigning the cell format that has been entered by a user interacting with the GUI elements to respective pattern elements of the pattern. Each mapping of one of the pattern elements to a canvas element comprises formatting said canvas elements in accordance with the cell format assigned to the pattern element that is mapped onto said canvas element.

The "cell format" as used herein is a specification of visual properties of a canvas element. The cell format can originally be specified and assigned to an element of a pattern, e.g. to a data element or a formula element or to a pattern that is element of a super-pattern. The cell format preferably also affects the visual properties of the elements of the pattern displayed in the GUI used for defining the pattern, and at least affects the visual properties of the canvas elements (e.g. spreadsheet cells) to which the respective element of the pattern is mapped. The cell format may specify e.g. the background color, border color, border thickness, font type, font color, background image or the like of the canvas element (and optionally also of the element of the pattern to which the cell format is originally assigned). Thus, the cell format specified and first applied to visual properties of an element of the pattern can be propagated automatically during the mapping process to a respective canvas element. This may enable the user to intuitively comprehend from which element of a pattern a particular canvas element received its content.

For example, a GUI element may be a button, a pane, a grid, a select box, a menu or menu item, a check box, or the like. In one example, the GUI comprises one or more predefined data GUI elements, one or more predefined formula GUI elements and a pane with a grid. The user is enabled to select a data GUI element, assign it to one of the data sequences and position the selected data GUI element at an arbitrary position on the grid. The user may then select a formula GUI element, assign it to one of the formula sequences and position the selected formula GUI element at an arbitrary position relative to the data GUI element on the grid. The user may continue selecting data and formula GUI elements, assigning the selected elements to data and formula sequences and positioning the selected data and formula GUI elements relative to each other on the grid until the totality of the formula and data elements included in the pattern reflects the mathematical function that shall be modeled by the pattern. Then, the user may select via the GUI the canvas or a particular canvas area onto which the pattern shall be applied.

For example, the GUI may comprise a select menu that enables the user to select a particular starting canvas cell in an electronic document that represents the first canvas element onto which a pattern element is mapped when the pattern is applied on the canvas the first time. The selection of the canvas, canvas area or starting canvas element may automatically trigger the repeated application of the pattern on the canvas. In some alternative embodiments, the canvas, canvas area or starting canvas element is not selected by the user but is rather selected automatically. For example, the canvas of the currently displayed worksheet may be used as the canvas that is filled by the pattern with the formulas and data values. In some embodiments, the GUI may comprise a further GUI element, e.g. a button that enables the user to trigger the repeated application of the pattern after the canvas, canvas area or starting canvas element was selected. An example embodiment of said GUI is shown in FIG. 4. However, alternative implementation variants are also possible as shown e.g. in FIG. 11. According to the embodiment depicted in FIG. 11, no extra GUI in addition to the canvas comprising the data and formula sequences and the applied pattern is used for defining the pattern. Rather, pattern definition and pattern application is performed in the same GUI, e.g. the canvas of a spreadsheet application.

The data and formula sequences are ordered and one or more defined elements, e.g. the first element, of each data sequence or formula sequence represented by an element in the user-defined pattern are "consumed" in accordance with the order upon applying the pattern on the canvas a first time. Upon applying the pattern on the canvas a second dime, subsequent elements of the sequences represented in the pattern are consumed in accordance with the order of the sequences.

According to embodiments, the pattern comprises multiple formula elements respectively representing a different one of the formula sequences. In addition, or alternatively, the pattern comprises multiple data elements respectively representing different ones of the data sequences.

For example, the GUI may receive three data sequences $DS_{green}$, $DS_{black}$, $DS_{grey}$ and two formula sequences $FS_{red}$, $FS_{pink}$ as input. The pattern may (but does not necessarily have to) comprise one data element for each of the data sequences, e.g. DE-$DS_{green}$, DE-$DS_{black}$ and DE-$DS_{grey}$ and may (but does not necessarily have to) comprise one formula element for each of the formula sequences, e.g. FE-$FS_{red}$, and FE-$FS_{pink}$. In this case, each formula and data element represents a different one of the formula and data sequences.

In addition or alternatively, the pattern comprises at least two formula elements respectively representing the same one of the formula sequences and/or comprises at least two data elements respectively representing the same one of the data sequences.

According to embodiments, the method further comprises automatically generating an address for each data value of a data sequence, whereby the address is a combination of a data sequence identifier of the data sequence comprising the data value and an offset. The offset identifies the position of the data value within the data sequence. For example, the GUI may enable a user to select a list of data values in a cell block starting at cell D13 and ending at cell D36. The data values in this cell block are selected as a data sequence. The selection of a cell block of data values and the use of these data values as data sequence can comprise transforming the original addresses defined in the spreadsheet's cell matrix coordinate system D13, D14, . . . , D36 into a new address system, whereby the data value in cell D13 is identified by a combination of a data sequence identifier "$DS_{green}$," and an offset "1", i.e., "$DS_{green}$!1". The data value in cell D14 is identified by a combination of a data sequence identifier "$DS_{green}$" and an offset "2", i.e., "$DS_{green}$!2". This may be advantageous, as it allows to use addresses that abstract away the relative position of the data values within a given coordinate system of a spreadsheet application.

For example, if the GUI has received the data sequences $DS_{green}$, $DS_{black}$ and $DS_{grey}$ and the formula sequences $FS_{red}$ and $FS_{pink}$, the generated pattern could comprise a first data element DE1-$DS_{green}$ representing the first data sequence $DS_{green}$ and could comprise a second data element DE2-$DS_{green}$ that also represents the data sequence $DS_{green}$ but that receives a data value that is contained in the data sequence $DS_{green}$ at a particular position ("offset"). In this case, the data values in the data sequence $DS_{green}$ actually used by the respective data elements $DE1\text{-}DS_{green}$ and $DE2\text{-}DS_{green}$ when applying the pattern on the canvas may be identified with offset information.

In addition, or alternatively, the program logic is configured for automatically generating an address for each formula of a formula sequence. The address is a combination of a formula sequence identifier of the formula sequence comprising the formula and an offset. The offset identifies the position of the formula within the formula sequence.

For example, the automatic creation of the addresses for the formulas and/or data values can be created in the background by the program logic when a user defines, creates or imports data sequences or formula sequences in an electronic document, or when the user starts defining patterns whose elements represent the data sequences and formula sequences. The automated creation may comprise translating cell-matrix-based addresses in a new address schema consisting of a combination of a sequence-ID and an offset. This may allow decoupling the references contained in formulas from the specific location of the formulas and data values within a canvas coordinate system of an electronic document.

According to some embodiment, the program logic provides a functionality referred herein as "selection stepper" that allows a user to include multiple elements in a pattern, whereby the elements refer to the same data sequence or formula sequence (or pattern or super-pattern sequence, if any) but to different positions within said sequence. Thus, a selection-stepper may specify the sequence of positions in the represented data sequence $DS_{green}$ from which the data element receives data values when the pattern is mapped to the canvas and is used to fill the canvas elements with data values.

Depending on the embodiment, multiple different options for implementing a selection stepper and for enabling a user to define sequence element retrieval offsets for the individual pattern elements can be applied.

According to a first example of the selection stepper, the pattern-definition-GUI enables a user to define the selection stepper of a particular element of a pattern by providing the following three data values: the identifier of the data/formula/pattern sequence represented by said element; the start position within said sequence; the offset, whereby the offset defines the position of the sequence element relative to the start position that comprises the data/formula/pattern instance to be mapped on the canvas when the pattern is applied the second time on the canvas.

To give a concrete example, the pattern may comprise three data elements $DE1\text{-}DS_{green}$, $DE2\text{-}DS_{green}$, $DE3\text{-}DS_{green}$ and three respective selection steppers $SSTDE1\text{-}DS_{green}$, $SSTDE2\text{-}DS_{green}$, $SSTDE3\text{-}DS_{green}$ which are configured by a user as follows:

Data element $DE1\text{-}DS_{green}$ represents the first data sequence $DS_{green}$. The selection stepper $SSTDE1\text{-}DS_{green}$ is configured such that a data value at the first position of data sequence $DS_{green}$ is mapped to the canvas when applying the pattern a first time, and that a data value at the $4^{th}$ (start position+offset=1+3) position of data sequence $DS_{green}$ is mapped to the canvas when applying the pattern (and pattern element $DE1\text{-}DS_{green}$) a second time. A data value at the $7^{th}$ (4+3) position of data sequence D1 is mapped to the canvas when applying the pattern a third time. The pattern definition GUI enables the user to configure the selection stepper $SSTDE1\text{-}DS_{green}$ by providing the following three data values: data-sequence-ID="$DS_{green}$", start-position="1", offset="3".

Data element $DE2\text{-}DS_{green}$ also represents the first data sequence D1. The selection stepper $SSTDE2\text{-}DS_{green}$ is configured such that a data value at the second position of data sequence D1 is mapped to the canvas when applying the pattern a first time, and that a data value at the $5^{th}$ (start position+offset=2+3) position of data sequence $DS_{green}$ is mapped to the canvas when applying the pattern (and pattern element $DE2\text{-}DS_{green}$) a second time. The pattern definition GUI enables the user to configure the selection stepper $SSTDE2\text{-}DS_{green}$ by providing the following three data values: data-sequence-ID="$DS_{green}$", start-position="2", offset="3".

Data element $DE3\text{-}DS_{green}$ also represents the first data sequence $DS_{green}$. The selection stepper $SSTDE3\text{-}DS_{green}$ is configured such that a data value at the third position of data sequence $DS_{green}$ is mapped to the canvas when applying the pattern a first time, and that a data value at the $6^{th}$ (start position+offset=3+3) position of data sequence $DS_{green}$ is mapped to the canvas when applying the pattern (and pattern element $DE3\text{-}DS_{green}$) a second time. The pattern definition GUI enables the user to configure the selection stepper $SSTDE3\text{-}DS_{green}$ by providing the following three data values: data-sequence-ID="$DS_{green}$", start-position="3", offset="3".

According to a second, preferred example, the pattern-definition-GUI enables a user to define the selection steppers of multiple elements of a pattern by specifying only the source sequence and the "packet size" which is identical to the number of selected pattern elements representing said sequence and which corresponds to the offset assigned to the selection stepper of each of the selected elements. The start positions of the selection steppers differ from each other by one position. For example, the user is enabled to select a set of n pattern elements and to enter the identifier of the (data-, formula- or pattern) sequence to be represented by each of said selected elements. Thus, only two pieces of data have to be provided by the user for n elements contained in the pattern: the number n, which represent a "packet size" or "offset" of the sequence elements to be processed upon each application of the pattern, and an identifier of the respective data, formula or pattern sequence.

To give a concrete example, the user may select the three data elements $DE1\text{-}DS_{green}$, $DE2\text{-}DS_{green}$, $DE3\text{-}DS_{green}$ mentioned above, thereby defining the packet size/offset/n to be "3". Then, the user provides the ID of the data sequence $DS_{green}$. The program logic is configured to automatically configure the selection stepper $SSTDE1\text{-}DS_{green}$ such that data-sequence-ID="$DS_{green}$", start-position="1", offset="3, to configure the selection stepper $SSTDE2\text{-}DS_{green}$ such that data-sequence-ID="$DS_{green}$", start-position="start-position$_{SSTDE1DSgreen}$+1", offset="3, and to configure the selection stepper $SSTDE3\text{-}DS_{green}$ such that data-sequence-ID="$DS_{green}$", start-position="start-position$_{SSTDE2DSgreen}$+1", offset="3. Thus, the specification of the selection steppers may be facilitated. According to preferred embodiment, the program logic enables the user to define the packet size by selecting consecutive elements of a formula sequence or data sequence contained in a canvas, e.g. by selecting a block of three consecutive spreadsheet cells comprising the first three data values of a data sequence with a mouse or other suitable device as shown in FIG. 11.

According to embodiments, the program logic providing the pattern definition GUI in addition enables the user to use formula sequences, in particularly formula sequences extrapolated automatically from two or more formulas, for defining highly complex sequence element selection routines. For example, in order to enable a user to define a pattern p comprising a data element DE'-$DS_{green}$ that maps a data value from the $2^{nd}$ position of a data sequence $DS_{green}$ upon the first application of p on the canvas, and that maps a data value from the $5^{th}$ ($2^{nd}$+offset=3) position of the data sequence $DS_{green}$ upon the second application of p on the canvas, the user can manually or automatically specify a new formula sequence $FS_{red}$'={$FS_{red}$!1=$DS_{green}$!2; $FS_{red}$!2=$DS_{green}$!5; . . . ; end of manual formula entry/end of formula-extrapolation}. Then, the user may configure a selection stepper SSTDE1-$DS_{green}$' for the formula element SSTDE1-$DS_{green}$' in accordance with example 1 or example 2 such that the formula-sequence-ID="$FS_{red}$'", start-position="1", offset="1.

The references in the formula used as basis for extrapolation need not be consecutive. For example, it is possible that the first originally specified formula references a data value in $DS_{green}$!A1, a second originally specified formula references a data value in $DS_{green}$!A3 and a third originally specified formula references a data value in $DS_{green}$!A5. By extrapolating these three formulas and including a formula element representing the extrapolated formula sequence in a pattern, a defined, non-consecutive sub-set of data values in the data sequence $DS_{green}$ are retrieved upon applying the pattern on a canvas.

By combining formula extrapolation and the option to configure selection steppers (e.g. by simply selecting the first n elements of a formula sequence or data sequence shown in a canvas of an electronic document for specifying the "packet-size" of the sequence elements processed in each pattern application step), the user is enabled to specify highly complex sequence element selection schemes without the need to duplicate any code.

According to embodiments, the pattern definition GUI offers the user both the "first example" option and the "second example" option for configuring selection steppers.

According to an example implementation, the user may configure selection stepper SSTDE1-$DS_{green}$ such that the data element DE1-$DS_{green}$, if applied on the canvas, fills the first, third, fifth, . . . , kth data value of the data sequence $DS_{green}$ in the canvas upon being applied the first, second, third, . . . , last time, whereby k is the last odd-numbered position in the data sequence $DS_{green}$. The data element DE2-$DS_{green}$ can be associated with a second selection stepper that selectively fills the second, fourth, sixth, . . . , lth data value of the data sequence $DS_{green}$ in the canvas, whereby l is the last even-numbered position in the data sequence $DS_{green}$. Thus, when said pattern is applied the first time on the canvas, data element DE1-$DS_{green}$ will fill the canvas element to which it is mapped with the first data value of $DS_{green}$ and data element DE2-$DS_{green}$ will fill the canvas element to which it is mapped with the second data value of $DS_{green}$. When said pattern is applied the second time on the canvas (at a different region of the canvas), data element DE1-$DS_{green}$ will fill the canvas element to which it then mapped with the third data value of $DS_{green}$ and data element DE2-$DS_{green}$ will fill the canvas element to which it is then mapped with the fourth data value of $DS_{green}$.

In addition or alternatively, the pattern may comprise a formula element FE1-$FS_{red}$ representing the formula sequence $FS_{red}$ and could comprise a second formula element FE2-$FS_{red}$ that also represents the formula sequence $FS_{red}$. In this case, the two formula elements FE1-$FS_{red}$, FE2-$FS_{red}$ may respectively comprise a selection-stepper, whereby the selection-stepper specifies the sequence of positions in the represented formula sequence $FS_{red}$ from which the formula element receives formulas when the pattern is mapped to the canvas and is used to fill the canvas elements with formulas or respective formula results.

According to preferred embodiments, the assignment of selection steppers to data elements and formula elements and the step-width of the individual selection steppers is configurable by the user via the GUI.

Thus, embodiments of the invention may allow a user to flexibly combine formula and data elements and respective sequences irrespective of whether a formula comprises a single or multiple references to input data values and/or irrespective of whether these multiple input data values belong to the same or to different data sequences. By using data-element and formula-element specific selection steppers, whose step-width is preferably configurable by the user via the GUI, the repeated application of the pattern can flexibly be configured and performed such that any originally specified dependency between a formula and other formulas and/or input data values can correctly be reproduced when applying the pattern multiple times on a canvas using data and formula sequences as input.

According to embodiments, the GUI comprises a display pane with a grid. The grid enables the user to define the spatial relationship of data elements and formula elements (and pattern elements or super-pattern elements, if any) to each other. Each data element, formula element, pattern element and super-pattern element, if any, is freely positionable in the grid via a gridline-snapping mechanism.

Each data, formula, pattern and/or super-pattern element is positionable adjacent to as well as non-adjacent to other pattern elements of the pattern. The pattern may consist of a set of adjacent data, formula and/or pattern element (of any order) or may consist of two or more sub-sets of non-adjacent elements. In other words, the pattern may comprise empty grid elements lacking any data, formula or pattern element.

According to embodiments, the method further comprises receiving the user's selection of one of the elements of the canvas to act as starting element. The method further comprises performing the repeated application of the pattern, thereby automatically filling, starting from the selected starting element, the canvas. The filling comprises mapping a predefined pattern element of the pattern (e.g. the topmost and leftmost element of the pattern) to the selected starting element (e.g. a particular cell in an Excel worksheet); and mapping all other pattern element of the pattern to the other elements in the canvas in accordance with the relative position of pattern elements in the pattern and in accordance with a predefined or user-defined pattern application direction. For example, in case the pattern application direction is from top to bottom of the canvas, the other elements of the pattern will be mapped to respective elements of the canvas from top to bottom. When the pattern is applied on the canvas the next time, the elements of the pattern will be mapped to new elements of the canvas below the cells to which the pattern was mapped the first time.

According to embodiments, the method is implemented by an office application or a plug-in or Add-on of an office application, wherein the office application is in particular a spreadsheet application. Enabling a user to define and repeatedly apply a pattern on a canvas via built-in functions of an office application or via a plug-in or add-on may be advantageous as functions enabling a user to flexibly handle and process huge and complex lists of data values and formulas can seamlessly be integrated into the known functions of the respectively used office program.

According to embodiments, the GUI further comprises a GUI element enabling the user to switch between three different view modes of the canvas of the electronic document. The three view modes comprise:
- a data view that displays in each of the canvas elements that is mapped to a formula element of the pattern the result returned by a respective formula of the formula sequence represented by said formula element;
- a formula view that displays in each of the canvas elements which is mapped to a formula element of the pattern an originally specified or extrapolated formula rather than a formula result;
- a minimalistic formula view that
  - displays in each of the canvas elements which is filled with an originally specified formula said originally specified formula rather than a result provided by the formula; and
  - that displays in each of the further canvas elements that are filled with an extrapolated formula a predefined visual element such that each of the further canvas elements does not show any formula or data value.

The provision of three different, user-selectable view modes may be advantageous as it allows a user to see the data/formula results of interest in the data view and to review the formulas underlying the result values in the formula view, e.g. for identifying errors or in order to comprehend the mathematical function specified in the formulas. In case the applied formula sequence was generated by an automated formula extrapolation step, the minimalistic formula view may allow the user to focus on the few (typically two) originally specified formulas that were used for generating the formula sequence in an automated extrapolation step. Thereby, the complexity of the totality of—potentially interdependent—formulas in a canvas may be reduced.

For example, the "predefined visual element" can be a specially formatted or designed canvas element, e.g. a specially formatted spreadsheet cell, a canvas element with dots or an image element. For example, the predefined visual element may have a particular background color, border or hatching and hides any formulas or formula results that may have been filled into the canvas elements in the background, thereby reducing the complexity of the canvas.

According to embodiments, the method further comprises providing a first input worksheet of a spreadsheet application. The first input worksheet comprises a first block of cells comprising data values. Then, the method comprises receiving a user's selection of the first block, and using the data values in the selected first block as one of the one or more data sequences.

This may be advantageous, because a user is enabled to create data sequences very easily and intuitively simply by selecting a block of cells of a spreadsheet application which comprises a sequence of data values.

According to embodiments, the method comprises providing a second input worksheet of a spreadsheet application, the second input worksheet comprising a second block of cells comprising one or more formulas. The one or more formulas are preferentially a series of at least two formulas referencing the cells of the first block of cells. The first and the second worksheet may in fact be the same worksheet, e.g. the worksheet used as the canvas onto which the pattern is applied. The method further comprises receiving a user's selection of the second block, and using the formulas in the selected second block as one of the one or more formula sequences.

This may be advantageous, because a user is enabled to create formula sequences very easily and intuitively simply by selecting a block of cells of a spreadsheet application which comprises a sequence of formulas.

According to embodiments, the receiving of the one or more data sequences comprises receiving, by the GUI, a user's selection of a first list of data values stored in a first worksheet of an electronic document and a user's selection of a second list of data values stored in a second worksheet of said or another electronic document, and using the first list of data values as a first one of the data sequences and using the second list of data values as a second one of the data sequences.

This may be advantageous as multiple different electronic documents or the same electronic document may be used as data source from which two or more data sequences are derived.

In addition, or alternatively, the receiving of the one or more formula sequences comprises receiving, by the GUI, a user's selection of a first list of formulas stored in a first worksheet of an electronic document and a user's selection of a second list of formulas stored in a second worksheet of said or another electronic document, and using the first list of formulas as a first one of the formula sequences and using the second list of formulas as a second one of the formula sequences.

The first and the second worksheet may be the same worksheet or may be different worksheets. This may be advantageous as multiple different electronic documents or the same electronic document may be used as source from which two or more formula sequences are derived.

According to embodiments, the method further comprises automatically generating one of the formula sequences. The generation comprises:
- receiving at least two (originally) specified formulas, each of the at least two specified formulas comprising one or more references to one or more of the data values of one or more of the data sequences and comprising one or more operators which specify how the referenced data values are to be processed;
- automatically generating further formulas by extrapolating the references in said at least two specified formulas until an extrapolated reference would reference a data value not comprised in the one or more data sequences referenced by the two specified formulas;
- using the at least two specified formulas and the further generated formulas as the one formula sequence.

For example, the at least two specified formulas can be formulas which were specified by a user manually. The at least two specified formulas may also be referred to as "originally specified" formulas, because in some embodiments, said at least two originally specified formulas are used as basis for generating further formulas by extrapolation from the at least two specified formulas. The at least two specified formulas can be specified e.g. in at least two respective cells of a canvas of an office application, or in at least two respective lines of a file, or in at least two respective data records in a database, or the like. Preferably, the at least two specified formulas are elements of an ordered list, e.g. are stored in adjacent cells of a worksheet of a spreadsheet application.

According to embodiments, the formula extrapolation is implemented as linear extrapolation. In particular, the extrapolation comprises linear extrapolation of the offsets within addresses contained in a formula for referencing a data value or another formula value.

For example, the extrapolated formulas can be used as a formula sequence that is represented by a formula element of a pattern.

According to embodiments, the program logic is configured to perform the following method in response to a user editing one of said at least two specified formulas:

re-extrapolating the references of the at least two formulas comprising the edited formula until an extrapolated reference would reference a data value not comprised in the one or more data sequences referenced by the two specified formulas;

using the at least two specified formulas and the further generated formulas as the a re-extrapolated version of the formula sequence; and automatically re-applying any pattern or super pattern comprising a formula element representing the formula sequence on the canvas, thereby mapping the extrapolated version of the formulas on the canvas.

Thus, in some embodiments, the editing of the originally specified formulas will automatically trigger a new extrapolation of the further formulas and will trigger the overwriting of the previously extrapolated further formulas with the newly extrapolated further formulas.

According to embodiments, the program logic is adapted to automatically lock the cells comprising the extrapolated or re-extrapolated formulas, thereby preventing the user from modifying any extrapolated or re-extrapolated formula in the canvas. This lock, also referred to as "extrapolated formula lock", may protect the formula from any change to all references, operands and operators contained therein. The "extrapolated formula lock" selectively allows the user to edit the canvas elements comprising the at least two formulas which are the basis for the extrapolation.

For example, in case the first formula is "$DS_{green}!1\times13+FS_{red}!3$" and the second formula is "$DS_{green}!2\times13+FS_{red}!3$", the program logic may be configured to extrapolate a third formula to be "$DS_{green}!3\times13+FS_{red}!3$" and a fourth formula to be "$DS_{green}!4\times13+FS_{red}!3$", which may be automatically filled into the canvas next to the existing first and second formula. The user may not be allowed e.g. to change the third and fourth formula, thereby ensuring that the linear extrapolation is valid throughout the whole extrapolated formula sequence.

According to embodiment, the formula extrapolation is based on two formulas and the program logic is adapted to automatically lock the second one of the two formulas such that the user is selectively allowed to modify the references in the second formula. This lock, also referred to as "conceptual formula lock", allows the user to selectively modify the references in the second formula, but neither other parts of the operands nor the operators contained therein. Thus, the user is prevented from accidentally modifying the "basic structure or concept" of the first formula, but is still able to define the references used as basis for extrapolation. Hence, the program logic may protect the second formula such that a linear extrapolation based on the first and the currently edited second formula is still possible.

For example, in case the second formula is "$DS_{green}!2\times13+FS_{red}!3$", the program logic prevents the user from transforming the second formula into "$DS_{green}!2\times14+FS_{red}!3$" or into "$DS_{green}!2\times13+5$". However, the user is allowed to change the references of the second formula, e.g. into "$DS_{green}!2\times13+FS_{red}!4$". In this case, the re-extrapolation may result in a new, extrapolated formula sequence comprising a third formula "$DS_{green}!3\times13+FS_{red}!5$" and a fourth formula "$DS_{green}!4\times13+FS_{red}!6$".

The first formula used as basis for the extrapolation is preferably free of any locks.

According to embodiments, the formula extrapolation is unidirectional. For example, the user may select two adjacent formulas in a row of a canvas and trigger a formula extrapolation in horizontal direction, e.g. to the left or right. Alternatively, the user may select two adjacent formula cells in a column and may trigger a formula extrapolation in vertical direction, e.g. in upward or downward direction.

According to other embodiments, the formula extrapolation is multidimensional, e.g. two-dimensional. A user may select e.g. two adjacent formula cells in a row to trigger horizontal extrapolation first and may then select two adjacent formula cells in a column, thereby triggering vertical extrapolation of the formulas contained in the selected formula cells. As a result, a two-dimensional matrix of formulas may be generated.

According to further embodiments, the program logic is configured to generate a GUI with a dialog window. The dialog window enables a user to choose whether a one-dimensional or two-dimensional formula extrapolation is to be performed for a set of selected formula cells in a canvas or for two or more formulas to be entered by the user in the dialog window as a basis for extrapolation.

The method further comprises automatically filling a sequence of other canvas elements adjacent to the at least two selected canvas elements with the generated further formulas, the automated filling being performed in response to the user's movement of the cursor over at least one of the other canvas elements while holding a mouse button pressed, the releasing of the mouse button triggering the filling of the other canvas elements with the generated further formulas comprising the extrapolated references. In this example, the number of cells filled by extrapolated formulas depends on the total number of additional formulas generated in the extrapolation. Alternatively, the filling of the sequence of other canvas elements adjacent to the at least two selected canvas elements with the generated further formulas is performed in response to the user's cursor movement over the other canvas elements while holding the mouse button pressed, the releasing of the mouse button stopping the filling of the other canvas elements at the canvas element covered by the mouse cursor at the moment of release. In this example, the number of cells filled by extrapolated formulas depends on the total number of additional cells crossed by the mouse movement of the user, provided more formulas were extrapolated than canvas cells were crossed.

Said features may be advantageous, as the user is enabled to automatically or semi-automatically generate extrapolated formulas and fill canvas elements adjacent to the at least two specified formulas automatically with the extrapolated formulas in a manner the user might already be familiar with based on the auto-fill function of Excel for specific data series. The user may move the cursor over at least one of the other (typically adjacent) canvas elements, but may not need to know the exact number of other canvas elements that will be filled with formulas, because this number may depend on the number of data values in a referenced data sequence (which may be huge). In some embodiments, the number of cells filled with extrapolated formulas may deviate from the number of cells selected by the user with the cursor. For example, the user may release the mouse button after having moved the curser over two or three other canvas elements, but the number of cells actually filled with extrapolated formulas may have a range of several hundred, thousand or even more canvas elements. Nevertheless, the user may have the "extrapolate-by-dragging" feeling he or she is used to from Excel's data extrapolation.

According to further embodiments, the at least two specified formulas are received by the program logic used for providing the GUI for pattern definition by reading the at least two specified formulas from a configuration file or a database. The GUI comprises further GUI elements enabling the user to select the configuration file or to select a record of the database comprising the at least two specified formulas and for triggering the extrapolation of the at least two specified formulas for generating the one formula sequence.

According to preferred embodiments, the GUI for pattern definition comprises one or more formula entry GUI elements that enable a user to enter the at least two originally specified formulas. For example, the GUI used for pattern definition can in addition comprise formula entry fields enabling the user to define a formula sequences by entering at least two originally specified formulas.

According to embodiments, the GUI is configured to automatically extrapolate a formula sequence upon the user having entered the second formula in the one or more formula entry elements or upon the user having selected an additional trigger GUI element, e.g. a trigger button. For example, the GUI enabling the user to define the pattern can be implemented as a pop-up window comprising data elements and formula elements and the one or more formula entry GUI elements can be text fields contained in said pop-up window or in a further pop-up window.

Alternatively, as shown for example in FIG. 11, the program logic may enable a user to define the pattern within a canvas of an electronic document, e.g. the canvas of a spreadsheet application. For example, the program logic may enable the user to define the pattern in the canvas onto which the pattern is to be applied. The formula entry GUI element can be any element of said canvas, e.g. a cell of a spreadsheet document, which enables the user to enter a formula.

Said features may be advantageous as the user may not have to enter long lists of formulas manually. Moreover, many different types of data sources may be used for generating formula sequences by means of formula extrapolation.

According to embodiments, the generation of the formula sequence and the application of the pattern on the data sequences and formula sequences is performed continuously and interdependently.

For example, as soon as a new formula is extrapolated from existing ones, this formula is added to a respective formula sequence and a pattern comprising a respective formula element is applied on the canvas (provided that further data values and/or other formulas referenced in the pattern are available). This may be advantageous as the pattern is applied on the canvas and some formula output is displayed almost immediately once a further formula was extrapolated. Thus, in case formula extrapolation consumes a significant amount of time, it may be ensured that the user does not have to wait until the formula extrapolation has completed until he or she can see some first results of the pattern application on the canvas.

In a further aspect, the invention relates to computer system comprising a processor configured for:
receiving one or more data sequences, each data sequence being a sequence of one or more data values;
receiving one or more formula sequences, each formula sequence being a sequence of one or more formulas, each formula comprising one or more references to one or more of the data values of one or more of the data sequences and comprising one or more operators which specify how the referenced data values are to be processed;

providing a GUI, the GUI enabling a user to define a pattern comprising at least one data element and at least one formula element, each data element representing one of the data sequences and each formula element representing one of the formula sequences, the GUI enabling the user to define the spatial relationship of the data elements and formula elements in the pattern,
applying the pattern on a canvas of an electronic document a first time, the application comprising:
mapping the data elements and formula elements of the pattern to elements of the canvas;
filling each of the canvas elements mapped to a data element with the data value of the data sequence represented by said data element,
filling each of the canvas elements mapped to a formula element with one of the formulas of the formula sequence represented by said formula element or with a result value computed by applying the formula to the one or more data values referenced by said formula;
repeatedly applying the pattern on the canvas, thereby mapping the elements of the pattern to further elements of the canvas and filling the further elements of the canvas with further ones of the data values of the one or more data sequences and with further ones of the formulas of the one or more formula sequences or their results until all data values of one of the data sequences or all formulas of one of the formula sequences have been filled once into the canvas.

The computer system further comprises a storage medium comprising, for each canvas element mapped to a formula element, a result value, the result value having been computed by applying the formula filled into said formula element on the one or more data values referenced by the formula, the result value being stored in association with the data values and the formula used for computing the result value.

The computer system further comprises a display configured for displaying the GUI and the canvas.

In a further aspect, the invention relates to a tangible, non-volatile storage medium comprising computer-interpretable instructions which, when executed by one or more processors, cause the processors to perform a method for data processing control as described herein for embodiments of this invention.

In a further aspect, the invention relates to a computer-implemented method comprising:
receiving at least two specified formulas, each of the at least two formulas comprising one or more references to one or more data values of one or more data sequences and comprising one or more operators which specify how the referenced data values are to be processed, each data sequence being a sequence of one or more data values;
automatically generating further formulas by extrapolating the references in said at least two specified formulas until an extrapolated reference would reference a data value not comprised in the one or more data sequences referenced by the two specified formulas;
generating a formula sequence, the generated formula sequence comprising the at least two specified formulas and the further generated formulas; and
filling canvas elements of a canvas of an electronic document with the formulas of the generated formula sequence.

For example, the formulas can be specified e.g. via a user's selection of formula cells or manual entry of formulas in a canvas of an electronic document or via a selection of a file or one or more database records or by manually specifying the formulas in a file or in one or more database records.

According to embodiments, the method further comprises:

receiving the one or more data sequences;

receiving one or more formula sequences, the one or more formula sequences comprising the generated formula sequence;

providing a GUI, the GUI enabling a user to define a pattern comprising at least one data element and at least one formula element, each data element representing one of the data sequences and each formula element representing one of the formula sequences, the GUI enabling the user to define the spatial relationship of the data elements and formula elements in the pattern, applying the pattern on the canvas of an electronic document a first time, the application comprising:
  mapping the data elements and formula elements of the pattern to elements of the canvas;
  filling each of the canvas elements mapped to a data element with the data value of the data sequence represented by said data element,
  filling each of the canvas elements mapped to a formula element with one of the formulas of the formula sequence represented by said formula element or with a result value computed by applying the formula to the one or more data values referenced by said formula;

repeatedly applying the pattern on the canvas, thereby mapping the elements of the pattern to further elements of the canvas and filling the further elements of the canvas with further ones of the data values of the one or more data sequences and with further ones of the formulas of the one or more formula sequences or their results until all data values of one of the data sequences or all formulas of one of the formula sequences have been filled once into the canvas.

According to embodiments, the canvas of the electronic document is a worksheet of a spreadsheet application or a sub-region thereof or a slide of a presentation application.

According to embodiments, the method further comprises, before performing the filling of the canvas:
  automatically predicting the number of further formulas to be generated by the formula extrapolation;
  automatically identifying all elements in the canvas that will be filled by the formula sequence; and
  outputting a warning message that data might be lost in case the identified elements in the canvas already comprise other content and/or locking the identified elements in the canvas such that manual editing of the identified cells is prohibited.

According to embodiments, the method further comprises providing a GUI comprising a GUI element enabling the user to switch between three different view modes of the canvas. The three view modes comprise:
  a data view that displays in each of the canvas elements that is filled with a formula of the generated formula sequence the result returned by the respective formula;
  a formula view that displays in each of the canvas elements which is filled with one of the at least two specified or with one of the extrapolated formulas the specified or extrapolated formula rather than a result provided by the formula;
  a minimalistic formula view that
    displays in each of the canvas elements which is filled with one of the at least two specified formulas said specified formula; and
    that displays in each of the further canvas elements that is filled with one of the extrapolated formulas a predefined visual element such that each of the further canvas elements does not show any formula or data value.

Thus, the three different view modes may be advantageously applied in the context of a canvas that was filled by automatically applying a pattern multiple times as well as in the context of a canvas comprising one or more (long) lists of formulas created via extrapolation from only a few, typically two, originally specified formulas.

According to embodiments, the at least two specified formulas received in response to a user's selection of at least two canvas elements comprise the at least two specified formulas. The method further comprises automatically filling a sequence of other canvas elements adjacent to the at least two selected canvas elements with the generated further formulas. The automated filling is performed in response to the user's movement of the cursor over at least one of the other canvas elements while holding a mouse button pressed. The releasing of the mouse button triggers the filling of the other canvas elements with the generated further formulas comprising the extrapolated references.

According to embodiments, the at least two specified formulas are received by reading the at least two specified formulas from a configuration file or a database. The GUI comprises further GUI elements enabling the user to select the configuration file or a record of the database comprising the at least two specified formulas and to trigger the extrapolation of the at least two specified formulas for generating the one formula sequence.

In a further aspect, the invention relates to a computer system comprising one or more processors. The processors are configured for performing a method for generating a formula sequence by automatically extrapolating two or more specified formulas as described herein for embodiments of this invention.

In a further aspect, the invention relates to a tangible, non-volatile storage medium comprising computer-interpretable instructions which, when executed by one or more processors, cause the processors to perform a method for generating a formula sequence by automatically extrapolating two or more specified formulas as described herein for embodiments of this invention.

The computer implemented method is performed on a computer system. The computer system can be a distributed computer system or a stand-alone computer system. The computer system can be a standard desktop computer system, a server computer system, a cloud computer system, a mobile computer system, a smart phone, a notebook, a tablet computer or the like. The computer system can comprise one or more processors, main memory and a non-volatile storage medium.

Embodiment of the invention described herein can provide a computer-implemented method of data processing control that, in particular, accelerates and eases the definition of complex, formula-based calculations in a spreadsheet application and that eases the maintenance and modification of such formulas. This is achieved by providing means to manually define a pattern that spatially interrelates elements of different sequences to each other, whereby also the format of these elements in the pattern is spatially organized based on the defined pattern. Then, the pattern is applied multiple times automatically, whereby the mathematical relationship of the formulas as well as the format of the elements in the pattern is propagated to the spreadsheet cells onto which the pattern is applied. This is achieved by a special GUI, e.g. the GUI of the spreadsheet application or the GUI generated by a plug-in or add-on of the spreadsheet application. The GUI enables a user to define the spatial relationship of the data elements and formula elements in the pattern. Once the pattern is defined, it is be automatically applied on the canvas multiple times until all elements of the shortest data or formula sequence involved have been "applied" on the canvas. For example, this can be achieved by automatically rearranging all other spreadsheet cells (their data/formula content and their format) comprising other elements of the sequences involved in the pattern definition in accordance with the relative element position defined in the pattern. Hence, the user does not have to manually copy-paste complex formulas to generate complex formula specifications in a worksheet of a spreadsheet application that is hard to maintain and update. This provides for a non-abstract improvement of computer functionality: current spreadsheet applications do not allow defining and maintaining highly complex, repetitive, formula-based calculations in an error-robust, easy manner. The definition of such formulas in state of the art spreadsheet applications is time-consuming and error-prone. Embodiments of the invention may overcome these problems by modifying and enhancing the way how spreadsheet elements and their format is handled in a spreadsheet application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following embodiments of the invention are explained in greater detail, by way of example only, making reference to the drawings in which:

FIGS. 3a-3d depicts two pairs of a data view and a formula view of a canvas comprising a data sequence and a formula sequence;

FIG. 4 depicts a block diagram of a computer system with a GUI and a canvas, the GUI enabling a user to define and apply a pattern on the canvas;

FIGS. 6a-6c depicts a data view and a formula view of a canvas filled by repeated application of a pattern;

FIGS. 7a-7b depicts a data view and a formula view of a canvas of a state-of-the art application program;

FIGS. 8a-8d depicts the semi-automated generation of a formula sequence triggered by a cursor movement over the canvas;

FIG. 9 depicts data sequences and formula sequences in a minimalistic formula view;

FIGS. 11a-11j depicts a method of defining and applying a pattern in a canvas of a spreadsheet application, the canvas comprising the data sequence and formula sequence represented by elements of the pattern.

DETAILED DESCRIPTION

Figure 1A:
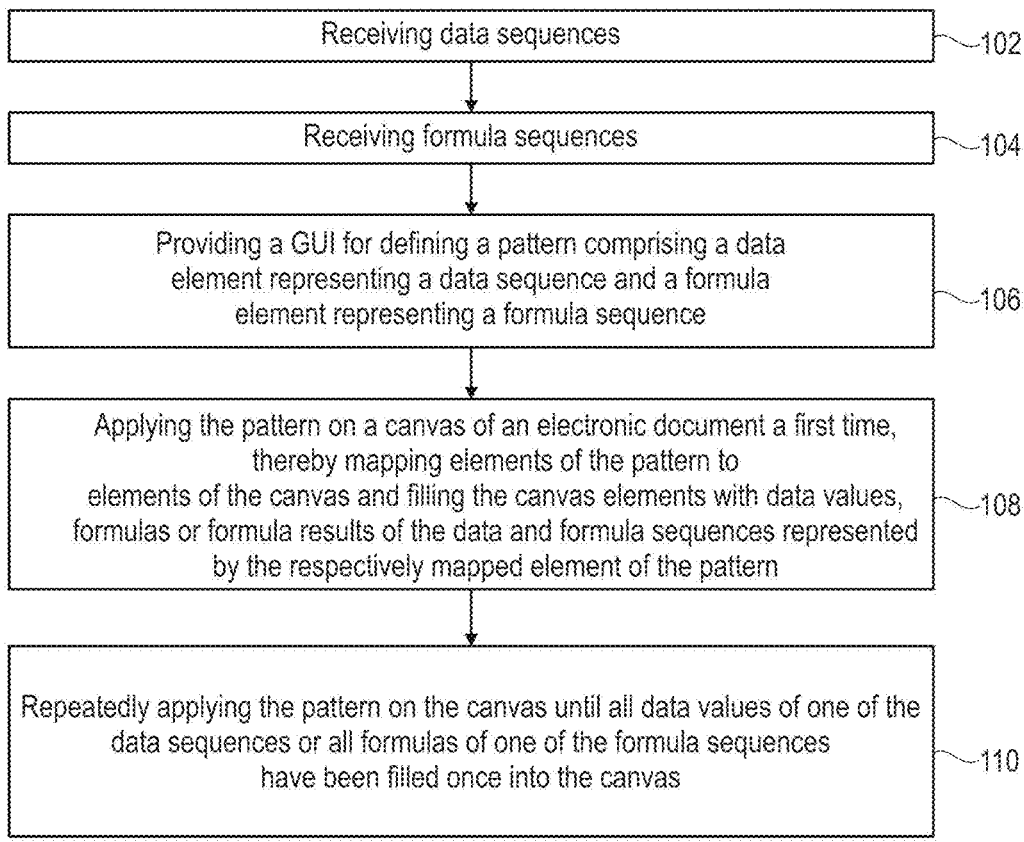
FIG. 1a depicts a flow chart of a method for automatically filling a canvas with data and formulas.

An "electronic document" as used herein is a set of data which are electronically formed, sent, received or stored on electronic, magnetic, optical or other medium and that preferably encodes a digital picture of a document similar to a paper document. For example, an electronic document can be a digital file of an office application like MS Word, MS Excel, MS PowerPoint, OpenOffice, and others.

A "canvas" or "electronic canvas" as used herein is a region of an electronic document, e.g. a page or a part of a page of an electronic document, that is configured to be presented to a user as a visual output, e.g. a display and/or a printout. Preferably, the canvas comprises individual elements, e.g. cells, that can be addressed individually and that can comprise data values and/or formulas and that can be assigned a defined format (e.g. a particular background color or background image, a border color, border width, font type, font size, font color and the like).

A "worksheet" as used herein is a single page of an electronic document, e.g. a spreadsheet document that contains cells organized by rows and columns or that enables a user to specify a formula that references a data sequence or a formula sequence via a matrix-based coordinate system. For example, a worksheet can begin with row number "1" and column number "A". In some embodiments, the whole worksheet consists of cells organized by rows and columns. In other embodiments, only parts of the electronic document may comprise or consist of the above mentioned tabular organization of cells. In still other embodiments, a "worksheet" does not comprise a graphical representation of a cell matrix in the form of a matrix or table comprising rows or columns, but at least comprises some GUI elements allowing a user to specify a reference to a data sequence or formula sequence by specifying an address in a matrix-based coordinate system, e.g. "A1" or "C12" or "worksheet-14!C12". These addresses are then automatically transformed into coordinate-system independent addresses consisting of a combination of sequence-ID and offset position within said sequence. In addition, or alternatively, a user may be enabled by the program logic of embodiments of the invention to select a consecutive block of canvas elements comprising data values or formulas, assigning a sequence-ID to said block of canvas elements, and trigger the automated transformation of coordinate-based canvas-element identifiers to addresses being a combination of a sequence-ID and an offset, e.g. a combination of "$DS_{green}$" and "3", i.e., "$DS_{green}$ !3". For example, the program-logic can be a plug-in or add-on of a spreadsheet application generating an additional program menu or context menu enabling a user to assign a sequence-ID to a block of canvas cells having been selected with a mouse or a keyboard. The formulas contained in the selected block of canvas cells are preferably generated by extrapolating two or more originally specified formulas as described herein for embodiments and examples of the invention.

A "formula sequence" as used herein is a one-dimensional or multidimensional sequence of one or more formulas, preferably two or more formulas. The formulas in a formula sequence are ordered. In preferred embodiments, the references to the storage address of the one or more input data values to be processed by each formula of a sequence follow a mathematical sequence.

A one-dimensional formula sequence can be implemented, for example, as a one-dimensional vector or array. The formulas of a one-dimensional formula sequence can be stored, according to some examples, within cells of a particular row of a canvas comprising a matrix of cells, or within cells of a particular column of said canvas. In the case of a one-dimensional formula sequence having the sequence-ID $FS_{red}$, the first 10 formulas of the first and only dimension may be identified e.g. via addresses like $FS_{red}!A1$, $FS_{red}!A2$, $FS_{red}!A10$, whereby the character A and the numbers 1, . . . , 10 represent coordinates of a row or column of canvas cells comprising the respective formulas.

A multi-dimensional formula sequence can be implemented, for example, as a multi-dimensional vector or array, also referred to as "matrix". In the case of a two-dimensional formula sequence having the sequence-ID $FS_{2Dred}$, the first 10 formulas of the first dimension may be identified via addresses like $FS_{2Dred}!A1$, $FS_{2Dred}!A2$, $FS_{2Dred}!A10$ and the first 10 formulas of the second dimension may be identified e.g. via addresses like $FS_{2Dred}!B1$, $FS_{2Dred}!B2$, $FS_{2Dred}!B10$, whereby the characters A, B and the numbers 1, . . . , 10 represent coordinates of a cellular matrix comprising the respective formulas.

According to another example, the first formula in a particular one-dimensional formula sequence may comprise a reference to an input data cell address A13, the second formula in said formula sequence may reference an input data cell address A15, the third formula in said formula sequence may reference an input data cell address A17 and so on. Thus, the mathematical sequence can but does not have to be a list of consecutive integers, it may also be any other mathematical sequence for which the identification of the next element can be described and implemented by a computer program logic, e.g. a selection-stepper. In some implementation variants, the formulas of a formula sequence can comprise a reference to formulas of a formula sequence, whereby the formula results of the referenced formulas are used as input by the referencing formula. The formulas of a formula sequence can also comprise references to multiple formulas belonging to the same or multiple different formula sequences. According to embodiments, each reference in a formula cell references a particular data value within a data sequence or references a particular formula within a formula sequence (or the N-dimensional equivalent) using a sequence-ID and an offset. The offset indicates the position of the referenced data value within the data sequence or the position of the referenced formula within the formula sequence. References in a formula cell never reference a pattern as a pattern is merely a set of GUI elements arranged in a particular manner that defines the spatial relationship between data and/or formula cells. The pattern or any modification of the relative arrangement of elements in a pattern does not have an impact on the logical interdependency of formula references to particular data values or formula values of other formula sequences.

According to preferred embodiments, references into a sequence use the notation of a worksheet reference in Excel, and the offset into a sequence is be described using the two-dimensional Excel notation even if the sequence is one-dimensional. This may have the advantage that many users are already familiar with this form of notation. For example, a reference can look like "$DS_{green}!A1$" or "$FS_{red}!A1$". Alternatively, a one-dimensional notation can be used for one-dimensional sequences, such as "$DS_{green}!1$" or "$FS_{red}!1$".

A "data sequence" as used herein is a one-dimensional or multidimensional sequence of one or more data values, preferably two or more data values. The data values in a data sequence are ordered.

A one-dimensional data sequence can be implemented, for example, as a one-dimensional vector or array. The data values of a one-dimensional data sequence can be stored, according to some examples, within cells of a particular row of a canvas comprising a matrix of cells, or within cells of a particular column of said canvas. In the case of a one-dimensional data sequence having the sequence-ID $DS_{green}$, the first 10 data values of the first and only dimension may be identified e.g. via addresses like $DS_{green}!A1$, $DS_{green}!A2$, . . . , $DS_{green}!A10$, whereby the character A and the numbers 1, . . . , 10 represent coordinates of a row or column of canvas cells comprising the respective data values.

A multi-dimensional data sequence can be implemented, for example, as a multi-dimensional vector or array, also referred to as "matrix". In the case of a two-dimensional data sequence having the sequence-ID $DS_{2Dgreen}$, the first 10 data values of the first dimension may be identified via addresses like $DS_{2Dgreen}!A1$, $DS_{2Dgreen}!A2$, . . . , $DS_{2Dgreen}!A10$ and the first 10 data values of the second dimension may be identified e.g. via addresses like $DS_{2Dgreen}!B1$, $DS_{2Dgreen}!B2$, . . . , $DS_{2Dgreen}!B10$, whereby the characters A, B and the numbers 1, . . . , 10 represent coordinates of a cellular matrix comprising the respective data values.

A "pattern" as used herein is an assembly of two or more GUI elements on a visual coordinate system, e.g. on a grid of a GUI used for enabling a user to define the pattern. A pattern defines the number and relative position of the elements in the pattern to each other, whereby each of said elements may represent a formula sequence, a data sequence, or a pattern sequence of a lower hierarchical order (e.g. a "pattern element" contained in a super-pattern or a "super-pattern element" contained in a super-super-pattern). In some embodiments, the GUI used for defining a pattern enables a user to assign to each element in a pattern a respective visual format, and/or to assign to each element of the pattern the data sequence or formula sequence or pattern sequence of lower order. In addition, in some embodiments the GUI enables the user to assign to each element of the pattern the position of said element within the sequence.

According to embodiments, the GUI enables a user to assign, to each of the elements of the pattern, a particular position within the sequence represented by said pattern element whose content is to be mapped to the canvas when the pattern is applied the first time on the canvas. Thus, the user may explicitly or implicitly specify, for each pattern element, the "start position" within the sequence represented by said pattern element and an offset. For example, pattern element specific selection steppers can be used as described above.

According to embodiment, the GUI enables the user to specify the selection stepper for a particular pattern element by enabling the user to explicitly or implicitly enter the referenced data, formula or pattern sequence, a start position and an offset via the GUI. The starting position provides the content that is to be mapped to the canvas upon applying the pattern element on the canvas the first time. The position in the sequence providing the content when the pattern is applied the nth time plus the offset yields the position in the sequence that provides the content when the pattern is applied the nth+1 time.

In preferred embodiments, the process of pattern definition via the GUI and the process of assigning cell formats (or simply "formats") to the elements of the pattern has no impact on the way formulas compute a formula result from their respectively referenced one or more input data values. The input addresses of the formulas are specified such that the storage addresses of the storage comprising the respective data value can be identified irrespective of the relative position of formula elements and data elements within a pattern. For example, the address of a data value referenced by a formula may comprise an identifier of the data sequence to which the data value belongs and an identifier of the position (relative offset information) of said data value within said data sequence. For example, the identifier of the data sequence can be a reference to a file comprising the data sequence, a reference to a database or database table comprising the data sequence or a specification of the name of a particular block of cells within a particular worksheet of a particular electronic file comprising the data sequence. Thus, the formula element representing a formula sequence can freely be positioned in the pattern relative to the data elements representing the data sequences which comprise the input data for the formulas without updating the references in any of the formulas of the formula sequence represented by the formula element(s). When the pattern is applied repeatedly on the canvas, the canvas elements will be filled with data values and formulas contained in defined positions within their respective data and formula sequences, and when the pattern is applied again, the data values and formulas subsequent to the already "used" (filled in) data values and formulas in the respective data and formula sequences will be filled into a subsequent set of canvas elements. In this process, one or more selection-steppers can be used to specify that the data value or formula that is filled by a particular element of the pattern into a canvas element is not simply the next element in a respective data or formula sequence, but is e.g. the second or third element in said sequence.

Figure 2:
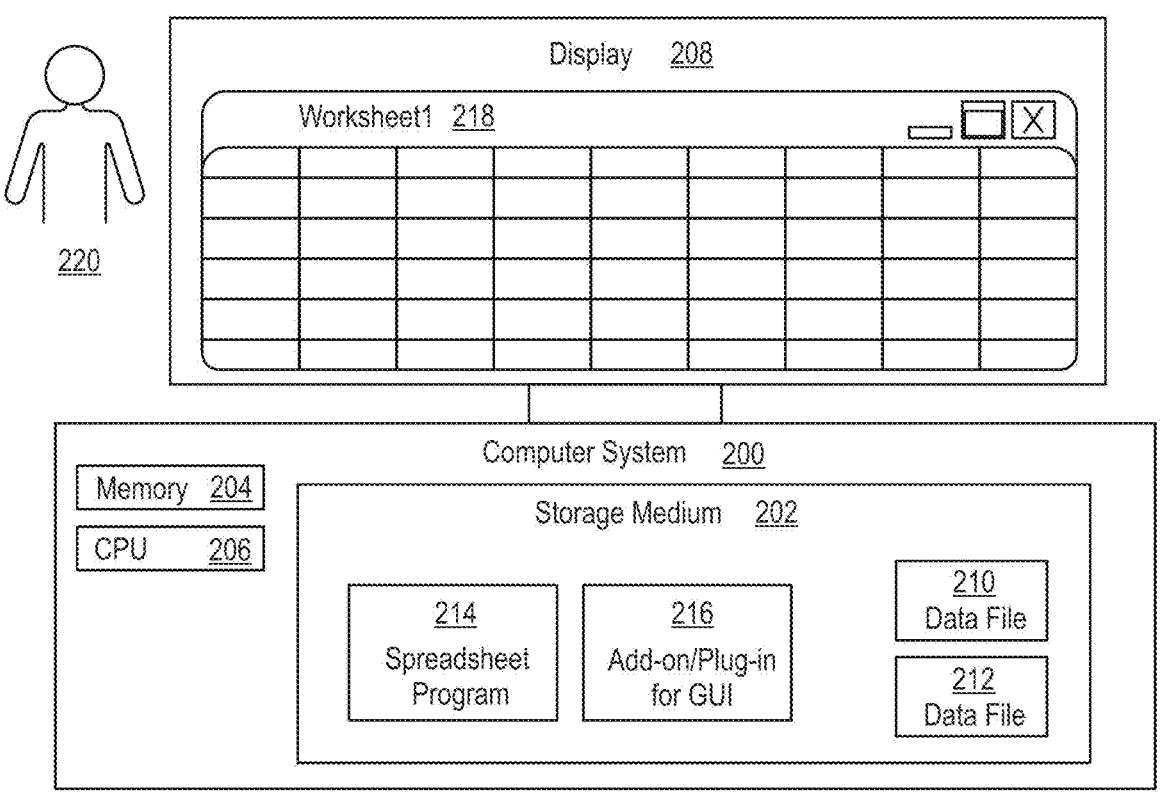
FIG. 2 depicts a block diagram of a computer system with a display depicting a canvas.

FIG. 2 depicts a block diagram of an embodiment of a computer system 200 with a display 208 depicting a canvas of a worksheet 218 of a spreadsheet application according to one embodiment of the invention. The computer system comprises a non-volatile storage medium 202 having stored thereon data sequences, formula sequences and executable program logic 214 for generating and displaying the worksheet 218, e.g. an executable spreadsheet application logic. The storage medium 202 may further comprise program logic 216, e.g. an Add-on or plug-in of the office application 214, whereby the program logic 216 is configured for generating a GUI for defining a pattern. In some alternative embodiments, the program logic 216 is an integral part of the office program 214 that generates the canvas that is to be filled with data and formulas with the help of the pattern. In addition or alternatively the program logic 216 may comprise functions for automatically extrapolating formulas from two or more originally specified formulas for generating a formula sequence that can be used e.g. for filling a canvas of an electronic document with the help of a pattern as described before.

The data and formula sequences can be stored in the storage medium in the form of files 210, 212, e.g. further spreadsheet documents. The computer system further comprises one or more processors 206 configured for executing the program logic 214, 216 and a main memory 204. The computer system comprises or is operatively coupled to a display 208, e.g. an LCD screen for displaying the electronic document 218 and/or a GUI for defining a pattern to a user 220. For example, the computer system can be a standard desktop computer system, a server computer system, a mobile computer system, a smart phone, a notebook, a tablet computer or the like.

FIG. 1a depicts a flow chart of a method for automatically filling a canvas with data and formulas according to one embodiment of the invention. The figure will in the following be described by making reference also to FIG. 2. In a first step 102, the program logic 216 receives one or more data sequences. Each data sequence is a sequence of one or more data values, preferably two or more data values. For example, a block of cells of a spreadsheet application can comprise a list of data values that is used and received as a data sequence.

In step 104, the program logic 216 receives one or more formula sequences. Each formula sequence may comprise multiple formulas listed in a predefined order, whereby also the references to input data values of one or more data sequences follow a mathematical sequence. For example, a block of cells of a spreadsheet application can comprise a list of formulas that references an ordered list of data values and that is used and received as a formula sequence. Each formula comprises one or more references to one or more of the data values of one or more of the data sequences. In addition, each formula comprises one or more operators, e.g. SUM, AVERAGE, PRODUCT, which specify how the referenced data values are to be processed.

In step 106, the program logic 216 generates a GUI that is displayed on the screen 208 and that enables a user 220 to define a pattern, super-pattern or super-super pattern as described herein for embodiments of the invention.

In step 108, which may be triggered by an explicit command of the user 220 via the GUI, the pattern is applied a first time on the canvas of the electronic document 218. Thereby, each formula element and data element of the pattern is mapped to a respective canvas element and a current formula or a current data value of the formula sequence or data sequence represented by said element is filled into said canvas element. The filling of a canvas element with a formula can comprise automatically computing the formula result and storing the formula result in association with the canvas element to be filled with the formula and the input data values in a storage medium 202. Whether the formula or the formula result or a different visual element is displayed in the canvas element may depend in some embodiments on the type of view selected by the user. For example, in some embodiments the user may choose between a data view, a formula view and a minimalistic formula view.

In step 110, the pattern is applied multiple times. Thereby, further ones of the data values and formulas of the data and formula sequences represented by the pattern are filled in further elements of the canvas until all data values of one of the data sequences or all formulas of one of the formula sequences have been filled once into the canvas. Thus, the program logic 216 does not need an explicit instruction of the user how often the pattern shall be applied. The program logic 216 can rather identify the number of times the pattern will be applied fully automatically based on the size and shape of the pattern which determines the number of data values and formulas "consumed" by each application of the pattern on the canvas and based on the number of data value and formula elements of the data and formula sequences.

In case a user intends to modify the relative position of data and formula cells, he or she may simply modify the pattern via the same GUI used for defining the pattern in step 106. Preferably, the GUI is configured such that the modified pattern is automatically re-applied on the canvas such that steps 108 and 110 are automatically repeated based on the modified pattern. Thus, the user does not have to manually modify and update complex formula matrices generated in a sequence of manual copy-paste operations as known in prior art application scenarios in order to rearrange interdependent data and formula cells.

Figure 1B:
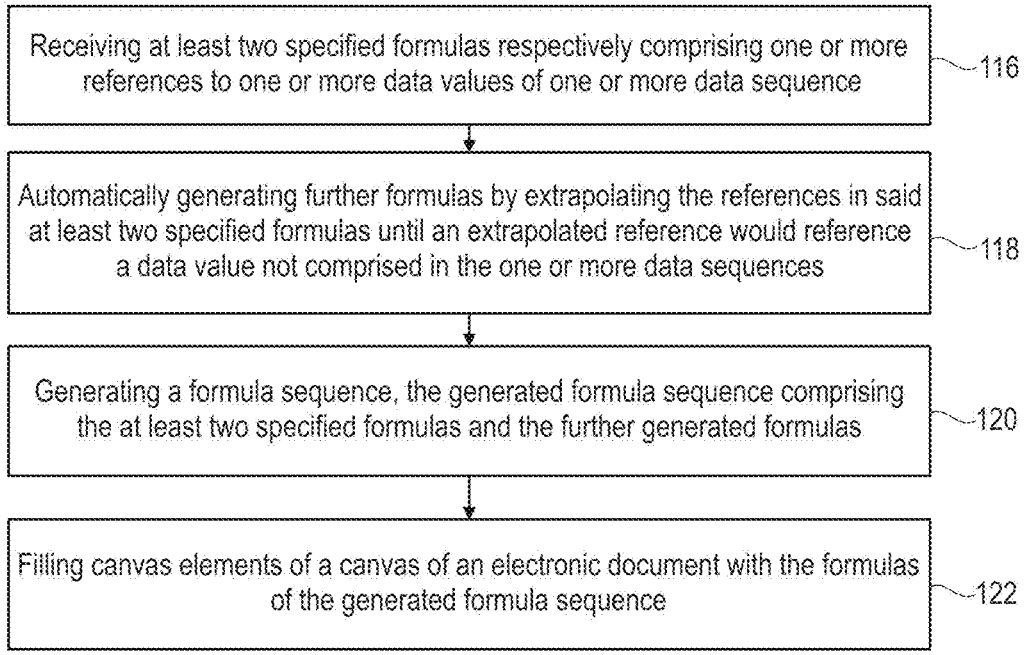
FIG. 1b depicts a flow chart of a method for generating a formula sequence by extrapolation.

FIG. 1b depicts a flow chart of a method for generating a formula sequence by extrapolation according to embodiments of the invention. The method can be implemented by the program logic 216 in addition to or as an alternative to the method depicted in FIG. 1a.

In step 116, the program logic 216 receives at least two specified formulas. Each of the at least two formulas comprises one or more references to one or more data values (or formulas) of one or more data sequences and comprises one or more operators which specify how the referenced data values are to be processed, each data sequence being a sequence of one or more data values. For example, a worksheet 218 of a spreadsheet application may comprise two adjacent formula cells, whereby the formulas in the two cells are ordered and also the references to input data values follow a mathematical sequence.

In some embodiments, the references contained in the at least two specified formulas are coordinate addresses of cells in the canvas that comprises the referenced data values or formulas. In other embodiments, the references contained in the at least two specified formula cells are combinations of identifiers of data sequences and internal offsets that identify the referenced data values within said data sequences or a combination of identifiers of formula sequences and internal offsets that identify the referenced formulas within said formula sequences.

In step 118, the program logic 216 automatically generates further formulas by extrapolating the references in said at least two specified formulas until an extrapolated reference would reference a data value (or formula) not comprised in the one or more data (or formula) sequences referenced by the two specified formulas. For performing the extrapolation, the program logic identifies references at the same logical position in the at least two specified formulas. For example, the first formula may specify=SUM(DataSeqence1!1: DataSeqence1!3), while the second formula may specify=SUM(DataSeqence1!4: DataSeqence1!6). In this case, the first reference in the first formula DataSequence1!1 and the first reference in the second formula DataSequence1!4 and the second reference in the first formula DataSeqence1!3 and the second reference in the second formula DataSeqence1!6 may be linearly extrapolated such that the program logic generates=SUM(DataSequence1!7: DataSequence1!9). More generally, a reference ref!N in the first formula and a reference in the same logical position ref!M in the second formula would be extrapolated to ref!$((x-1)*M-(x-2)*N)$ in the xth ($3^{rd}$ etc.) formula. This process is described in greater detail for the embodiment depicted in FIG. 8.

In step 120, the program logic 216 generates a formula sequence, whereby the generated formula sequence is a combination of the at least two specified formulas and the further generated formulas.

In step 122, the program logic 216 fills canvas elements of a canvas of an electronic document 218 with the formulas of the generated formula sequence.

The generated formula sequence can then be used by the program logic 216—in combination with other formula sequences and one or more data sequences—as input for generating a pattern as described for example with reference to FIG. 1a.

FIG. 3a depicts a data view of a worksheet of a spreadsheet application, whereby the highlighted cells A1-A12 comprise data values and represent a data sequence and whereby the highlighted cells B1-B12 comprise formulas and represent a formula sequence. When the user has selected the "data view", the results generated by the formulas rather than the formulas themselves are displayed. As the formula results may be used as input data values of other formulas, the data view may ease the checking whether the results computed by said other formulas are correct.

FIG. 3b depicts a formula view of the same worksheet as depicted in FIG. 3a, whereby instead of the results generated by the formulas the formulas themselves are displayed. As the formula results cannot be discriminated from data values in the data view, the formula view may ease the comprehension of the interrelatedness of formulas and formula sequences from data values and data sequences.

FIGS. 3c and 3d depict the same data sequence and formula sequence as described for FIGS. 3a and 3b, whereby the cells in the canvas and the data and formula sequences are identified and referred do according to a different naming convention. For example, the data sequence is identified via the unique identifier $DS_{green}$ and the formula sequence is identified via the unique identifier $FS_{red}$.

FIG. 4 depicts a block diagram of a computer system with a display 208 showing a GUI 902 and a canvas 904 of an electronic document according to embodiments of the invention. The GUI enables a user to define a pattern 916 and/or patterns of higher order, e.g. a super-pattern 922, and apply the pattern and/or the super-pattern on the canvas.

In the depicted embodiment, the GUI may receive a data sequence comprising a list of data values specified in a particular cell block. The data sequence is referred herein as "green" data sequence. For example, the cell block A1-A12 depicted in FIG. 3 may comprise the "green" data sequence. The GUI may further receive a formula sequence comprising a list of formulas that are specified in a different cell block. The formula sequence is referred herein as "red" formula sequence. For example, the cell block B1-B12 depicted in FIG. 3 may comprise the "red" formula sequence. The formulas of the red formula sequence reference data values of the "green" data sequence and use the referenced data values as input values. The GUI 902 enables the user 220 to select a GUI element 702 to act as a data element that represents the green data sequence. The GUI further enables the user to select a GUI element 704 to represent the red formula sequence.

The GUI enables the user to specify the pattern sequence gr-pattern (gr: "green-red") in a first step, and to specify that one green data element and one red formula element are combined such that the green data element is above the red formula element.

The user may assign a particular cell format, referred herein as "style 1" to the data element 702. The "style 1" cell format will be assigned to all canvas elements that will be mapped to the data element 702, thereby causing any font in said canvas cells to be presented in italic. The user may assign a particular cell format, referred herein as "style 3" to the formula element 704. The "style 3" cell format will be assigned to all canvas elements that will be mapped to the formula element 704, thereby causing any font in said canvas cells to be presented in bold. The result of the combination of the data element 702 and the formula element 704 is a pattern 916 of two elements referred to as "gr-pattern".

The references of the formulas of the formula sequence to the data values in the data sequence are preferably specified in the form of a combination of a data sequence identifier and an offset of the referenced data value within the data sequence and the program logic 216 maintains and stores the storage address of the first element of the data sequence to ensure the program logic can identify the data sequence and its elements irrespective of the position of the data elements in the canvas. Various notation schemes for referring to data sequences are presented in FIGS. 3*a*-3*d*. Preferably, the GUI enables the user to reference a particular data sequence or formula sequence by the sequence's identifier, e.g. a name like "$DS_{green}$" of the data sequence depicted in FIG. 3*c*.

Then, the "gr pattern" 916 is applied automatically multiple times on the canvas and fills a block of canvas elements 923, e.g. a block of cells in a spreadsheet document. The canvas onto which the pattern is applied multiple times can comprise a visible grid, e.g. the borders of cells of a spreadsheet application. However, in other embodiments, the canvas onto which the pattern is applied can partially or completely be free of a visible grid. The "gr pattern" consists of an upper "green data element" and a lower "red formula element". Thus, by applying the pattern multiple times on the canvas, a vertically intermitting format pattern of canvas elements having assigned cell format "style 1" and cell format "style 3" is created in the canvas. The canvas elements in block 923 are filled with a vertically intermitting sequence of data values and formulas referencing the data values. It should be noted that while the data values and formulas of the original data and formula sequences may be stored in separate cell blocks as depicted in FIG. 3, the formulas and data values in the canvas elements in block 923 have a vertically intermitting pattern that corresponds to the relative position of the data and formula elements 702 and 704 in the pattern.

The repeated application of pattern 916 on the canvas 904 generates a "pattern sequence" comprising four "gr-pattern cell sets" in canvas region 923. The sets of canvas cells onto which the pattern 916 was applied once have identical structure (relative position of cells comprising data values and formulas) that is defined by the relative position of data and formula elements of the pattern 916. However, the canvas cells of each of the four "gr-pattern cell sets" comprises different data values and formulas.

The user may then define a super-pattern 922. The super-pattern 922 combines three gr-patterns with a further formula sequence represented by the "yellow" formula element 706. The formulas of the yellow formula sequence may comprise a reference to the formulas of the red formula sequence and/or may comprise a reference to data values of the green data sequence. According to one example, the super pattern may have a height of 6 grid elements and a width of 2 grid elements and comprise an arrangement of elements as depicted below:

| | |
|---|---|
| Green data element | Yellow formula element |
| Red formula element | |
| Green data element | |
| Red formula element | |
| Green data element | |
| Red formula element | |

Whereby in fact, the three pairs of data and formula elements can be arranged by a user to a super-pattern. For example, a user may select combination of a single "yellow formula element" and three subsequent "gr pattern elements" for defining a super-pattern 922 as shown below:

| | |
|---|---|
| gr pattern element | Yellow formula element |
| gr pattern element | |
| gr pattern element | |

The term "yellow" pattern element indicates that this element has assigned a particular design and format ("style"), e.g. yellow background color, that allows to visually distinguish this pattern element from other pattern elements. The style is preferably transferred to the respectively mapped canvas cell. Thus, when a pattern comprising "yellow", "green" and "red" pattern elements in applied multiple times on a canvas, the respectively mapped canvas cell will receive the "yellow", "green" or "red" design of the pattern element that was respectively mapped onto it. To ease understanding, the data sequences and formula sequences represented by a particular pattern element will in the following also be identified by this color: for example, a data sequence represented by a "$DE-DS_{green}$" data element may have the identifier "$DS_{green}$". Configuring a selection stepper for this data element may use the notation "$DS_{green}!1,2$", whereby 1 is the first position and 2 is the second position, with all further positions determined by linear extrapolation. Of course, the identifier of a sequence does not have to reflect format properties assigned to respective pattern elements and any symbol string other than "$DS_{green}$" may likewise be used as an identifier of a sequence.

The user may then cause the program logic to apply the super-pattern on the canvas.

According to embodiments, the GUI or the program logic 216 is configured to automatically, in response to a user's "pattern element edit command", "pattern element format change command" or "pattern element re-positioning command" having been applied on any one of the elements of the pattern, automatically re-apply the user-modified pattern on the canvas. For example, a pattern or super-pattern that has already been applied on the canvas can be automatically re-applied on the canvas in response to a user induced re-positioning of any pattern element. Thus, in case the user modifies the relative position of e.g. data elements and formula elements in a pattern, the thereby generated new version of the pattern may automatically be re-applied on the canvas. According to embodiments, the GUI or the program logic 216 enables a user to define a pattern by selecting a region of a canvas as a "pattern region" and defining and/or arranging data elements and formula elements and pattern elements, if any, in this "pattern region" of the canvas. The pattern is then applied onto other regions of the canvas.

According to other embodiments, the GUI used for defining the pattern is not part of the canvas onto which the pattern is applied. For example, the GUI for defining the pattern can be implemented as a pop-up window.

According to some embodiments, the program logic enables the user to select a particular starting canvas element and the program logic may then automatically apply the pattern or super pattern as often as possible given the length of the received data and formula sequences, thereby filling canvas block 924. Whether the yellow formula element is on the first, second, . . . , or sixth line of the grid has no impact on the references of the formulas, so the user is free to arrange and format the different elements of the pattern as he likes.

According to some embodiments, each element of a pattern can be a data element, a formula element or an element representing an already defined pattern. In case at least one element of a pattern represents an already defined pattern, this pattern is referred to as a "super-pattern". For each element of a pattern, the user specifies the name of the (data, formula or pattern) sequence represented by said element and may specify the offset within the sequence ("intra-sequence offset", "selection stepper").

For example, a user may define a super-pattern 922 comprising a yellow formula element and three gr-pattern elements. The user may then assign selection steppers to each of the gr-elements and the yellow formula element. By applying this super pattern 922 multiple times on the canvas, canvas block 924 is generated.

To give a concrete example for the depicted embodiment, a user may define an element 916 (*gr*) representing a pattern that generates pattern sequence 922 by entering the following values via a GUI provided by the program logic 216:

green!1,2
red!1,2

For an element specifying the super pattern 922 adapted to generate canvas block 924, she would specify:

gr!1,4 (meaning, use !element 1 for the first pattern, element 4 for the second pattern and element 7 for the third pattern in the sequence etc.)
gr!2,5
gr!3,6
yellow!1

In an alternative, more concise but less general notation, the super-pattern 922 adapted to generate canvas block 924 could be specified as gr!1-3 (this generates three elements at a time)
yellow!1

Once the elements are specified, they can be freely arranged in the GUI, at which point the order or source of the elements is irrelevant and not restricting the placement in any way.

The program logic generating the GUI may comprise multiple selection-steppers and may manage an assignment 906 of said steppers to respective data, formula and pattern elements. The program logic may further comprise a library 908 of previously defined patterns and super patterns contained in a particular document or set of documents.

The program logic may further comprise a program logic 912 for generating a grid that eases the positioning of data, formula and pattern elements relative to each other. For example, when a user moves a data, formula or pattern element over the grid, the grid may be configured to automatically align or "snap" the element to the nearest grid line or the nearest intersection in the grid (even if the grid is not visible) or snap the element to other elements already contained in the grid. Gridlines may be a representation of a line or may simply be a particular coordinate. According to some embodiments, the positioning of the elements of a pattern is performed in accordance with the method of solving layout constraints as described in US patent application US020130194297A1, which is included herewith in its entirety by reference.

The program logic may further comprise a logic 914 for assigning different formats (styles) to different elements 702, 704 of a pattern 916, whereby the format is propagated upon application of the pattern on a canvas to the canvas elements mapped to the respective pattern element.

Figure 5:
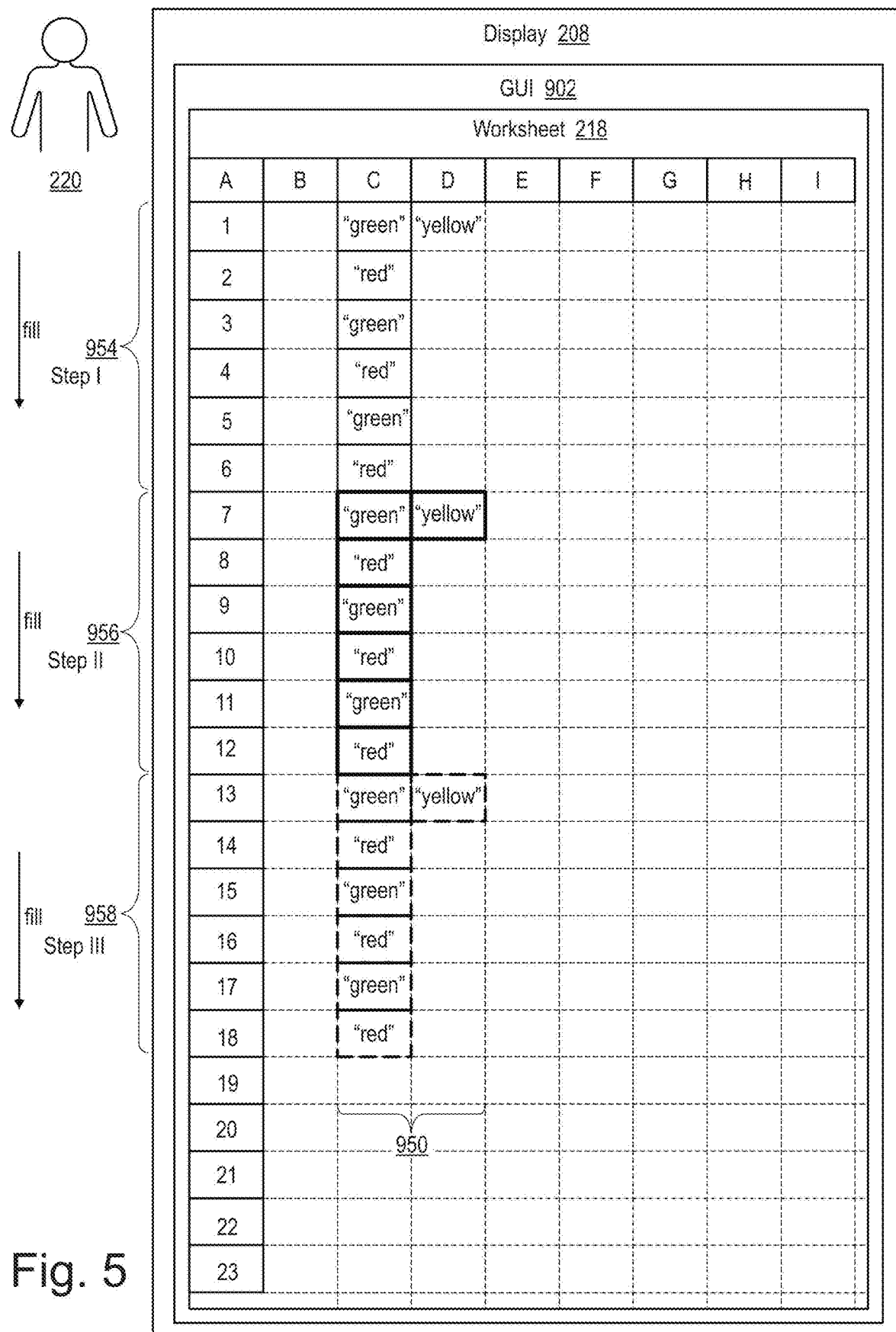
FIG. 5 depicts the canvas in greater detail.

FIG. 5 depicts the canvas 904 according to one embodiment in greater detail. The canvas elements indicated by number 950 are the product of applying the super pattern 922 described already for FIG. 4 three times on the canvas.

Irrespective of the relative position of the canvas elements to which the different data and formula elements are mapped, the references in the formulas will always point to the correct input data value or formula providing a formula result as input data value. This is because, according to preferred embodiments, the referenced addresses are specified by a combination of an identifier of a data sequence or formula sequence and an offset that indicates the relative position of the data value or formula within the sequence identified by the sequence identifier. For example, the program logic 216 may manage and temporarily store a copy of the data values of all received data sequences and/or may manage and temporarily store a copy of the formulas of all received formula sequences to support the identification of individual data values and formulas irrespective of the place in the canvas where they are presented to the user or from where they may be originally retrieved.

FIG. 6*a* depicts a data view of a canvas filled by repeated application of the super-pattern 922 described in FIGS. 4 and 5 based on a concrete example.

FIG. 6*b* depicts a formula view of the canvas depicted in FIG. 6*a* in data view. The first canvas element to which the yellow formula element is mapped (B6) comprises three references to three canvas elements A2, A4, A6 to which the three red formula elements of the super pattern 922 was mapped. Each of the formulas in the canvas elements A2, A4, A6 receive the data value contained in the respectively adjacent above canvas cells A1, A3, A5 as input, whereby the canvas cells A1, A3, A5 are filled with data values from the green data series upon applying the super-pattern 922 on the canvas a first time.

Figure 6C:
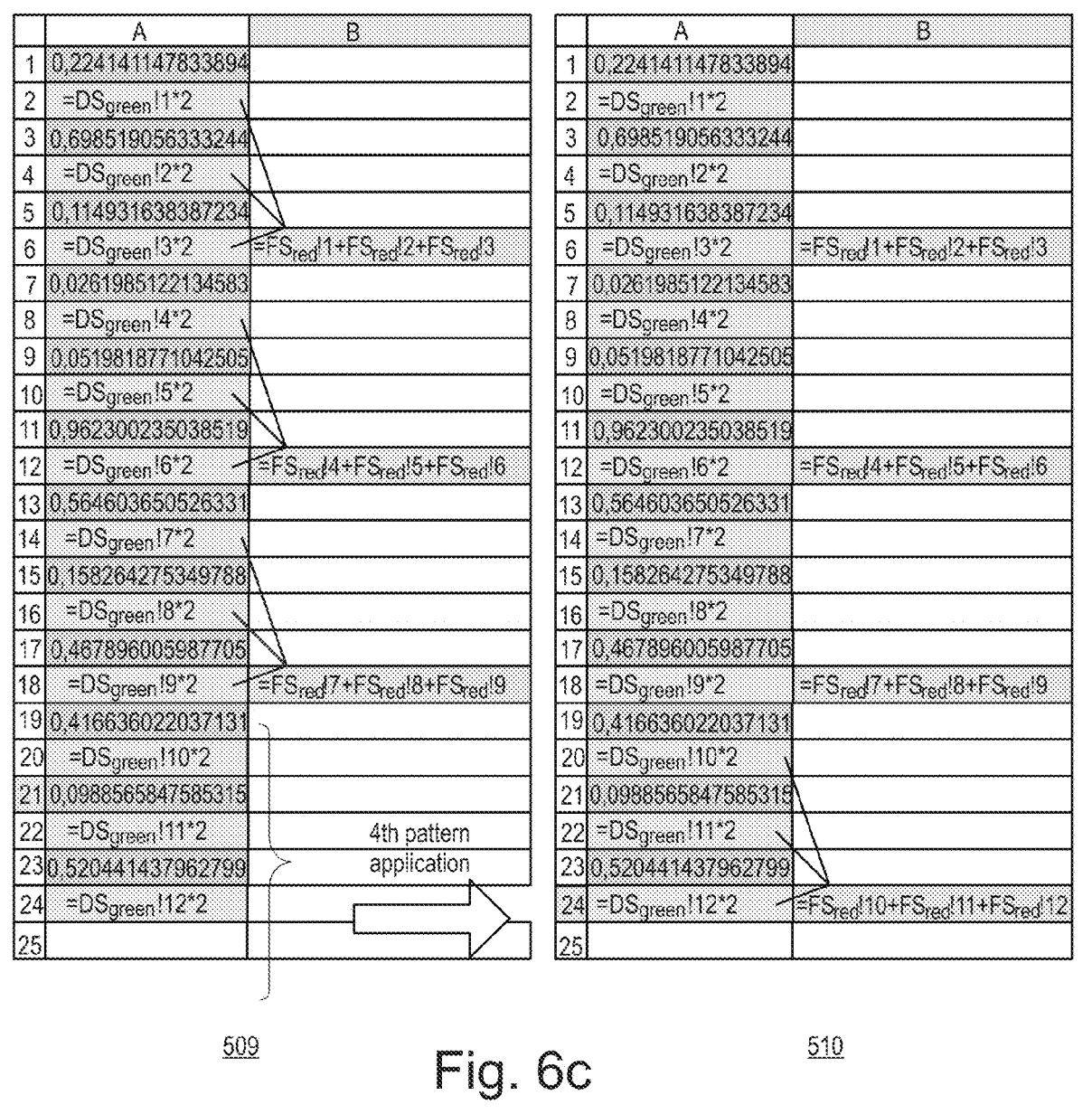

As can be inferred from FIGS. 6*b* and 6*c*, the references in the formulas in FIG. 6*b* depend on the position of the input data values in the canvas while the formulas in FIG. 6*c* are identified by a combination of a sequence-ID such as $DS_{green}$ and an offset. Thus, the references of the formulas in FIG. 6*c* are independent of the position of the input values in a particular canvas. By automatically transforming reference notations from a canvas-coordinate-system based representation in a sequence-ID/offset combination, embodiments of the invention may allow a user to freely modify the relative position of formulas and input data values in a canvas. In FIG. 6*b*, any re-arrangement of the data cells and/or of a formula cell referenced by a further formula cell in column B would result in an invalidation of the references of formulas pointing to the re-positioned cells. According to preferred embodiments, the addresses of data values and formulas are therefore represented as a combination of a series-ID (e.g. a series name) and an intra-series offset. This representation is depicted in FIGS. 6*c* and 8*c*, 8*d*. This specific way of representing the address of a particular formula or data value may be advantageous, as it allows re-arranging pattern elements representing different data and formula sequences relative to each other without the necessity to update the referenced addresses.

FIG. 7*a* depicts a data view and FIG. 7*b* depicts a formula view of a canvas of a state-of-the art application program, e.g. MS Excel. The FIGS. 7*a*, 7*b* show that the pattern sequence that may be created automatically via the pattern-based approach described e.g. for FIGS. 4-6 could not be produced or extended with MS-Excel-internal functions. Although Excel comes with some basic support of updating references when a formula is copied from a source cell to a target cell, the Excel-internal updating of the references is not able to capture complex references to multiple different source cells and is in particular not able to update the references correctly in case the "offset" from a source cell to a target cell (e.g. offset "1" from formula source cell B4 to formula target cell B5) differs from the offset of the referenced data values (e.g. "6"). Thus, FIG. 7 depicts a concrete use case scenario of filling a canvas with a complex sequence of interrelated data values and formulas that cannot be handled automatically or semi-automatically with state-of the art office software.

To the contrary, embodiments of the invention allow the automated filling of the canvas with an unlimited number of interdependent formulas and data values, whereby the user is free to position individual input sequences relative to each other as he or she wishes, is free to assign a customized format to cells filled by the same type of sequence and respective data or format element, and is free to define patterns of many hierarchical orders.

FIG. 8 depicts the semi-automated generation of a formula sequence by extrapolating a formula sequence comprising at least two originally specified formulas. The formula extrapolation depicted in FIG. 8 is triggered by a user's cursor movement over the canvas.

Figures 8A, 8B:

For example, a worksheet of a spreadsheet document as depicted in FIG. 8a may comprise two manually specified and comparatively complex formulas in cells B1 and B2. The first cell B1 may comprise a manually specified formula "=A2+A4+A6" and a second cell B2 right below the first cell comprises a manually specified formula "=A8+A10+A12". Thus, each formula comprises three references to other cells, whereby the three referenced cells (A2, A4, A6 in the case of B1) are themselves formula cells respectively referencing a single data cell (A1, A3, A5 in the case of A2, A4 and A6). Current office programs are not able to extrapolate a formula sequence from two or more originally specified formulas, in particular if said formulas comprise multiple references and/or if said references have offsets larger than 1.

However, the program logic 216 according to embodiments of the invention is configured to extrapolate two or more originally specified formulas for creating further, extrapolated formulas by analyzing the references of the at least two specified formulas position for position. At first, the program logic 216 analyzes the references at the first position, determines a reference offset "6" and obtains a first new reference "A14" by adding the offset "6" to the offset of the first reference of the last one of the at least two formulas (in this case, the formula in B2). Then, the program logic analyzes the reference at the second position, determines a reference offset of "6" and obtains a second new reference "A16" by adding the offset "6" to the offset in the second reference of the last one of the at least two formulas. Then, the program logic analyzes the reference at the third position, determines a reference offset of "6" and obtains a third new reference "A18" by adding the offset "6" to the offset in the third reference of the last one of the at least two formulas. Thus, the extrapolated new formula is "=A14+A16+A18". The extrapolated new formula is stored in a further canvas cell right below the second cell.

The program logic automatically continues extrapolating formulas and filling further canvas cells until one of the references exceeds the block A2-A24 comprising an input data value. In this case, the formula extrapolation process terminates automatically. The whole canvas block comprising the first and second originally specified formulas in combination with the further, extrapolated formulas constitutes an automatically generated formula sequence.

In some embodiments, the formula extrapolation is triggered by a user who selects the at least one specified formulas in B1, B2 via an interface device, e.g. a mouse or a stylus. The user may keep a selection button, e.g. a mouse button, pressed while moving the device in the direction along which the further extrapolated formulas shall be filled into the canvas. For example, the user may keep the left mouse button pressed while moving the mouse downwards over at least one cell, e.g. cell B3. The action of releasing the mouse button triggers the automated computation of further, extrapolated formulas, which are then filled into the cells subsequent to the selected formula cells B1, B2 until the end of the generated formula sequence is reached. Preferably, the user does not have to select the correct number of cells that will be filled with extrapolated formulas: the number of generated extrapolated formulas is determined automatically by program logic 216 which stops to generate new extrapolated formulas if a new formula would reference a data value or formula not contained in one of the referenced data sequences or formula sequences. Preferably, the program logic 216 also checks if any one of the cells (here: B3 and B4) that will be filled with an extrapolated formula already comprises data. In this case, the formula extrapolation may be aborted or a warning message may be generated which prompts the user to confirm that the existing data shall be overwritten.

According to preferred embodiments depicted in FIGS. 8c and d, the addresses of data values and formulas specified in a spreadsheet application are specified by a combination of a sequence identifier and an intra-sequence offset. For example, the addresses can be specified in the {sequence-ID-offset} format from the beginning. Alternatively, the addresses of the data values and formulas are automatically transformed, during or before the extrapolation, from a coordinate-address format as depicted in FIGS. 8a and b into the {sequence-ID-offset} format depicted in FIG. 8c, d.

FIG. 9 depicts data sequences and formula sequences in a minimalistic formula view. The canvas 700 comprises a "green" block of cells 702 comprising a first set of data values in cells A1-A12 and a further data value in B1. The "green" block of cells comprising data values can be represented in the form of a two-dimensional data matrix having the sequence-ID "$DS_{green}$". The canvas further comprises a "red" block of cells 704. The block 704 comprises a set of automatically generated formulas in formula cells C1-D12. The "red" block of formula cells 704 can be represented in the form of a two-dimensional formula sequence having the sequence-ID "$FS_{red}$". The canvas further comprises a "yellow" block of cells 706 comprising a further automatically generated formula sequence in cells E1-E4. The names "green", "red" and "yellow" are names or identifiers of the respective two-dimensional or one-dimensional sequences and may have any value. Some office programs, e.g. MS Excel, enable users to select cell blocks and assign an identifier, e.g. a name, to the cell block so that the cell block can be referenced by formulas outside this cell block.

The formula sequences in the red and yellow blocks 704, 706 were generated automatically or semi-automatically in an extrapolation step. In the minimalistic formula view that may be selected by a user as an alternative to the data view and the formula view, only the originally specified formulas are displayed. All canvas elements which are filled with an extrapolated formula are filled with or are overlaid with a visual element, e.g. with a box having a defined color or hatching, that indicates that the formulas in said canvas elements are automatically generated. The minimalistic formula view may hide complexity and may allow a user to quickly comprehend the structure of a complex set of interrelated formulas.

For example, the formula sequence contained in cells C1-C12 is generated automatically by extrapolating the two formulas which were originally specified in cells C1 and C2. The automatically generated, extrapolated formula that is filled into canvas element C3 (hidden in the minimalistic formula view by a red visual element) is "=$DS_{2Dgreen}$!A3*2". The automatically generated, extrapolated formula that is filled into canvas element C4 is "=$DS_{2Dgreen}$!A3*2", whereby "$DS_{2Dgreen}$" is an identifier of a data sequence whose data values are stored in cell block 702. The filling of canvas elements with extrapolated formulas automatically stops after having reached the element C12, because the referenced data sequence in A1-A12 comprises only 12 elements so a formula in C13 would comprise a reference that does not point to a data value that is element of the data sequence in A1-A12.

The formula sequence in cell block D1-D12 may be created by extrapolation from a single cell D1 only, because the formula contained therein comprises only a single reference with an extrapolation offset of "1".

The formula sequence contained in cells E1-E4 is generated automatically by extrapolating the two formulas which were originally specified in cells E1 and E2. The automatically generated, extrapolated formula that is filled into canvas element E3 (hidden in the minimalistic formula view by a red visual element) is "=$FS_{2Dred}$!SUM(A7:A9)". The filling of canvas elements with extrapolated formulas automatically stops after having reached the element E4, because the referenced formula sequence in A1-A12 comprises only 12 elements so a formula in E5 would comprise a reference that does not point to a data value that is element of the data sequence in A1-A12.

Figure 10:
FIG. 10 depicts a canvas on which a pattern was applied repeatedly in a minimalistic formula view.

FIG. 10 depicts a canvas 800 on which the super-pattern 922 depicted in FIG. 4 was applied repeatedly in a minimalistic formula view, whereby the references comprise an identifier of a cell block having assigned a user-defined identifier ("red"). Canvas 800 can be part of a different worksheet of the same electronic document comprising canvas 700 depicted in FIG. 9.

When a pattern (or in this case: a super-pattern) is repeatedly applied on a canvas, the program logic 216 recognizes if a formula that is currently filled into a canvas element is an originally specified formula or is an automatically extrapolated formula. In the minimalistic formula view, the originally specified formulas in canvas cells E1 and E2 of FIG. 9 are filled in the first and second application of the super pattern into cells B6 and B12 of canvas 800. In the minimalistic formula view, the canvas elements B6 and B12 show the formulas having been filled into said elements in the first and second application of the super-pattern, because these two formulas were originally specified. However, the canvas elements B18 and B24 show visual elements, e.g. yellow empty boxes, rather than formulas, because the formulas which were filled into cells B18 in the third application of the super-pattern and in B24 in the fourth application of the super-pattern were generated in an automated formula extrapolation step (and thus may be hidden for reducing complexity without significantly decreasing the information content of the canvas).

FIG. 11 depicts a method of defining and applying a pattern in a canvas of an office application, e.g. a spreadsheet application, whereby the canvas comprises the data sequence and formula sequence represented by elements of the pattern. The method and GUI depicted in FIG. 11 is an alternative embodiment to the method and GUI depicted in FIG. 4. A particular program logic, e.g. an integral program module or a plug-in or add-on to existing spreadsheet applications like Excel may enable a user to define and apply a pattern and/or to generate extrapolated formula sequences as described in the following without using an extra GUI in addition to the canvas provided by the office application.

In some first steps illustrated in FIG. 11A, the user may open a canvas of an office application, e.g. a worksheet of a spreadsheet application, and define a data sequence "Revenue" and a data sequence "Cost". The data sequences can be defined manually or by a data-value based extrapolation or by importing data value lists from external data sources, e.g. a database or one or more files. In addition, the user may start defining a "Profit" formula sequence by entering a first original formula into an arbitrary cell of the canvas, e.g. F21. The first original formula references the first value of the "Revenue" data sequence and a first value of the "Cost" data sequence. It is important to note that the addresses of the referenced data values (or formulas) are specified by a combination of the sequence-ID and an offset ("Revenue!1"), not by coordinates within the matrix of cells (B21). This address scheme ensures an independence of the logical interrelation of the "Profit" formulas from the data values in the "Revenue" and "Cost" data sequences from the relative spatial position of the formula and data sequences in the canvas.

As indicated by the comments "green/red/yellow background", the cell block comprising the "Revenue" data sequence, the cell block comprising the "Cost" data sequence and the cell block comprising the formulas or formula sequence "Profit" may have different formats and styles, e.g. different background colors, font types and font sizes, cell border colors and the like. The use of different formats and styles may greatly facilitate the use of formulas in an office document, because the user may immediately recognize the (business) concept a particular data value or formula represents.

In a further step illustrated in FIG. 11B, the user enters a second original formula right below the first original formula. Then, the user selects the first and second original formulas and triggers the automated generation of further formulas by extrapolating the two original formulas. The further formulas are automatically filled into cells adjacent to the two original formulas along the direction of extrapolation. For example, the user may select the two formula cells, select the lower right corner of the cell F22 and move the mouse several cells downwards while holding the mouse button pressed. When the mouse button is released, the cells F23-F32 are filled with the further, extrapolated formulas until the extrapolation is terminated when all data values of either the "Revenue" data sequence or the "Cost" data sequence (or both) have been "consumed/referenced" by an extrapolated formula. However, other implementation variants for triggering the extrapolation can likewise be used. For example, the office application may comprise a menu button which, upon being clicked or otherwise selected by a user, triggers extrapolation of a pair of two currently selected original formula values. According to other embodiments, the formula extrapolation is triggered by the completion of the specification of the second formula. For example, the extrapolation may be triggered upon the user currently having specified or edited the second formula now selects another cell or a menu element of an application implementing the canvas.

In further optional steps illustrated in FIGS. 11C and 11D, the user may switch to result view which shows formula results instead of the formulas in order to check if the formula generate result values as expected and may then switch back to the formula view.

In the formula view of the canvas depicted in FIG. 11D, the user starts generating a further "aggregated" formula sequence by specifying a further first original formula at an arbitrary cell of the canvas which sums up the range starting with the first and ending with the third element of the formula sequence "Profit".

FIG. 11E depicts the entry of a second original formula which sums up the range starting with the $4^{th}$ and ending with the $6^{th}$ element of the formula sequence "Profit". Then, the user explicitly or implicitly triggers the automated generation of the "aggregated" formula sequence by extrapolating the first and second original "aggregation" formula. The extrapolation generates a formula sequence comprising only four elements, because "Profit!12" referenced in the fourth aggregate formula sequence element is the last existing element in the "Profit" formula sequence.

As indicated by the comment "blue background", the cell block comprising the extrapolated "Aggregated" formula sequence may have a format and style that differs from the format and style of the canvas elements comprising the "Revenue", "Cost" and "Profit" sequences.

In a further optional step illustrated in FIG. 11F, the user may switch to result view in order to check if the "Aggregated" formula sequence generates result values as expected.

Figure 11G:
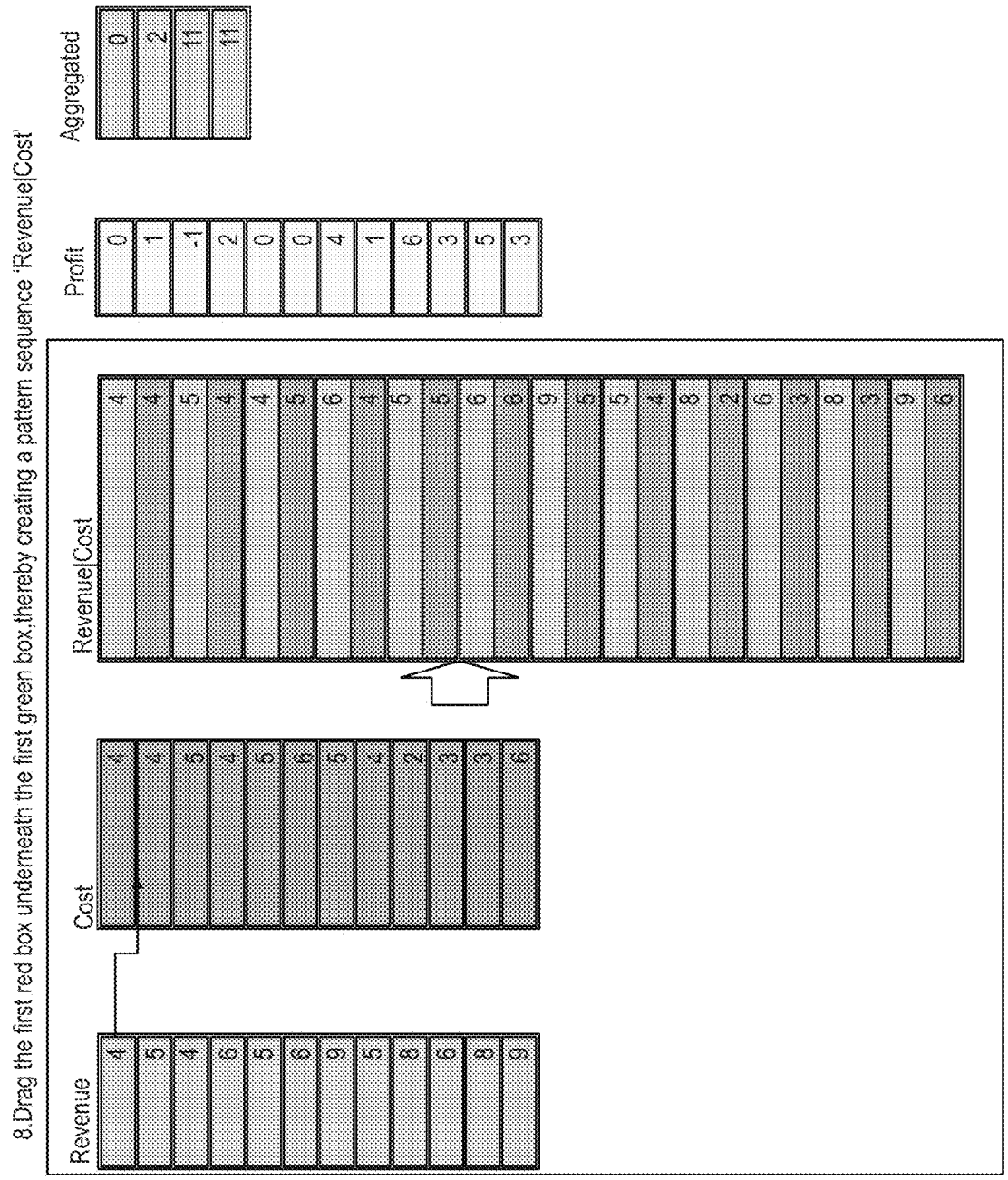

FIG. 11G depicts the creation of a pattern "Revenue|Cost" and the application of the pattern within the same canvas without an extra-GUI for pattern definition (as depicted for example in FIG. 4). The thick border indicates that the canvas elements contained within said border do not exist at the same time but rather represent a dynamic process. The canvas elements at the left side of the thick arrow are somehow re-arranged or re-grouped, and the result of this re-arrangement or re-grouping is depicted within said border at the right side of the bold arrow in each of the figures FIG. 11G to 11J.

According to the embodiment depicted in FIG. 11G, the first elements of an ordered sequence of elements (e.g. data sequences, formula sequences, pattern sequences) are used as GUI elements representing the sequence they are contained in. The user may select the first element of the "Revenue" data sequence and drag it underneath the first element of the "Cost" data sequence, thereby creating a pattern "Revenue|Cost". The format of this pattern in the depicted example is a two-element pattern wherein the upper data element has assigned green background color and represents the "Revenue" data sequence and wherein the lower data element has assigned a red background and represents the "Cost" data sequence. Once the first "Revenue" data sequence element is "released" underneath the first "Cost" data sequence element, the implicitly and automatically generated "Revenue|Cost" pattern is applied on the canvas multiple times, thereby copying all subsequent elements in the "Revenue" and "Cost" data sequences to a different region of the canvas, the different region of the canvas comprising multiple instances of the defined "Revenue|Cost" pattern generated by applying this pattern multiple times on the different region of the canvas. The copies of the elements of the "Revenue" data sequence and the "Cost" data sequence in the different region of the canvas are in accordance with the relative position of the data elements in the "Revenue|Cost" pattern having been defined by the depicted drag-and-drop operation.

According to embodiments, the program logic is adapted to generate a GUI element, e.g. a button, allowing a user to switch between different operation modes of the office action, wherein in a "normal" operation mode, the rearrangement of canvas elements is not considered as a definition of a pattern, and wherein in a "pattern definition operation mode", the re-arrangement of elements of two or more sequences relative to each other is interpreted by the program logic as a definition or re-definition of a pattern.

In some embodiments, the user may use a frame or another selection tool for specifying a region within the canvas or a particular worksheet wherein any re-arrangement of elements of two or more sequences relative to each other is interpreted by the program logic as a definition or re-definition of a pattern. Re-arrangements of sequence elements outside of this particular region will not be interpreted as the definition of a canvas and will not trigger the (re-)application of the pattern on the canvas.

In addition or alternatively, the application logic providing the canvas may be configured to operate in an operation mode wherein any re-arrangement of elements of two or more sequences relative to each other or at least any dropping of elements of one sequence onto the "docking zone" of elements of another sequence is interpreted by the program logic as a definition or re-definition of a pattern.

In preferred embodiments, the canvas is configured such that a neighborhood of a predefined or user-defined size around each block of cells representing a data sequence, formula sequence or pattern sequence acts as a "docking zone", e.g. a matrix of docking elements. A docking element is a canvas element or a set of canvas element that allows a dropped element to "snap" to a predefined position within the canvas. Preferably, a docking element is highlighted upon a mouse-over event during a drag&drop operation.

When a drag&drop operation is performed such that a sequence element is dropped onto one of the docking elements, the drag and drop is interpreted as a definition or re-definition of a pattern and all elements of the sequence comprising the dropped elements are re-arranged as well.

Hence, the first, manual re-arrangement of the sequence element(s) in the drag&drop operation is a pattern definition operation that triggers an automated re-arrangement of other elements of the sequences involved in the pattern generation in the canvas, whereby the automated re-arrangement of the other sequence elements in the canvas is performed in accordance with said drag/drop operation and corresponds to the repeated application of the pattern. Performing the automated re-arrangement of the other sequence elements in the canvas in accordance with said drag/drop operation means that the other canvas elements (their data content as well as their format) representing elements of the other sequences are rearranged such that the relative position of the re-arranged elements to each other is identical of the relative position of the manually re-arranged elements, but their absolute position of the other elements in the canvas is such that a non-overlapping sequence of "stamped patterns" is created in the canvas. In other words, the manual generation of the pattern in the drag&drop operation will automatically trigger the repeated, automated application of the generated or updated pattern on a particular region of the canvas. For example, the "involved sequences" can be all sequences in the canvas. According to other embodiments, the "involved sequences" are only those sequences in the canvas whose elements lie within the docking zone of elements of one or more other sequences.

Figure 11H:
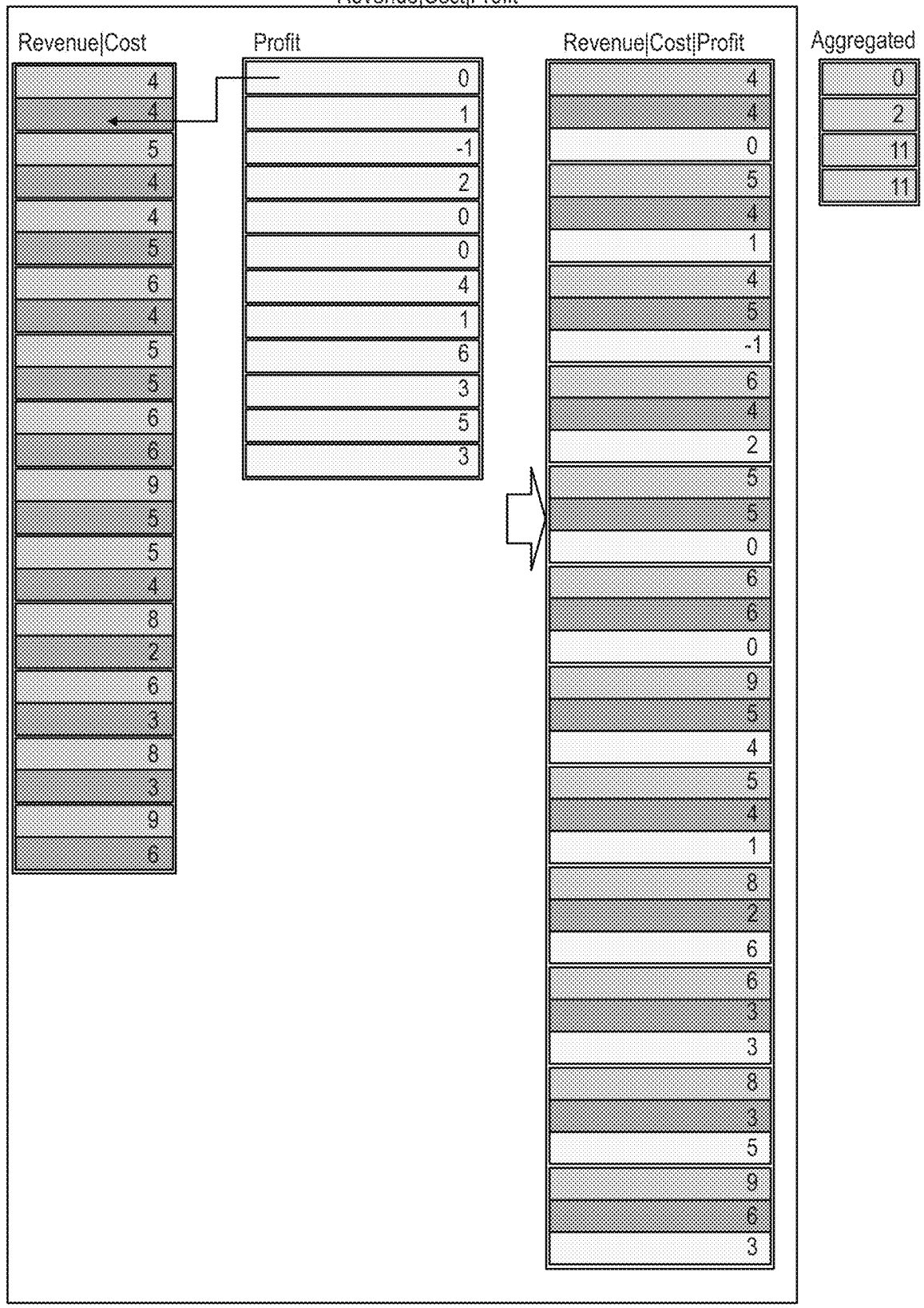

FIG. 11H depicts the creation of a super-pattern "Revenue|Cost|Profit" and the application of the pattern within the same canvas without an extra-GUI for pattern definition. For example, in the process of pattern sequence modification depicted within the borders of the thick black line, the "Profit" formula sequence and the "Revenue|Cost" pattern sequence generated in the previous step are now used as input for generating a super-pattern "Revenue|Cost|Profit". The first element of the "Profit" formula sequence is used as formula element representing said formula sequence. The user may select the first element of the "Profit" formula sequence and drag it underneath the first element of the "Revenue|Cost" pattern sequence, thereby creating a super-pattern "Revenue|Cost|Profit". The format of this pattern in the depicted example is a three-element pattern wherein the upper data element has assigned green background color and represents the "Revenue" data sequence, wherein the data element in the middle has assigned a red background and represents the "Cost" data sequence, and wherein the lower data element has assigned a yellow background and represents the "Profit" formula sequence.

Once the first Profit formula sequence element is "released", the implicitly and automatically generated Revenue|Cost|Profit pattern is applied on the canvas multiple times, thereby copying all subsequent elements in the "Revenue" and "Cost" data sequences and of the Profit formula sequence to a different region of the canvas.

Figure 11I:
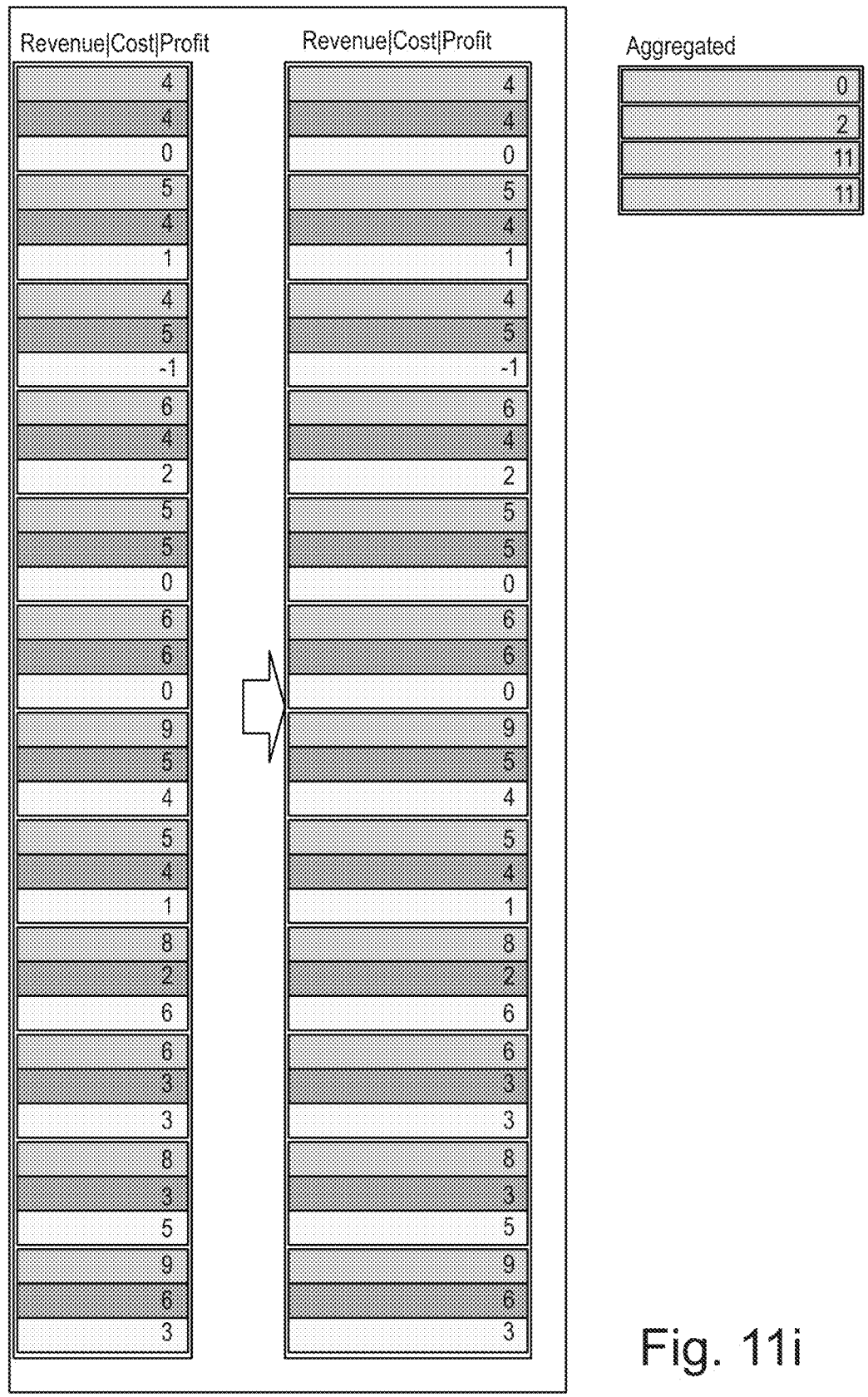

FIG. 11I depicts how a user may select a package-size of "three pattern elements" in the "Revenue|Cost|Profit" super-pattern sequence. For example, the user may select the first nine canvas elements corresponding to the first three instances of the applied "Revenue|Cost|Profit" super-pattern with the mouse, thereby specifying that the selected number of pattern instances is to be used as "coherent block" representing a single pattern element to be used in a following step for creating a super-super pattern.

Figure 11J:
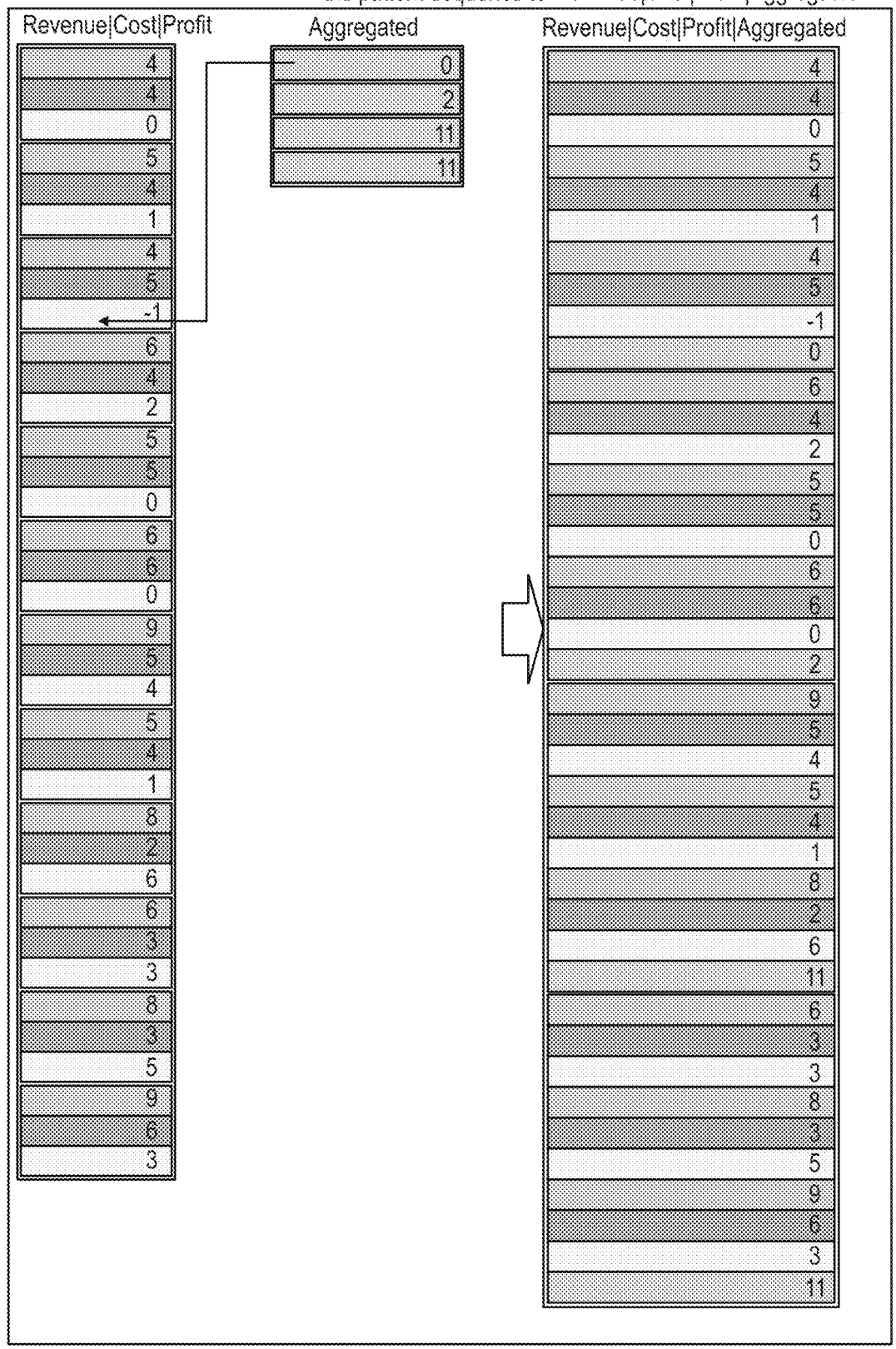

FIG. 11J depicts the creation of a super-super-pattern "Revenue|Cost|Profit|Aggregated" and the application. For example, the frame indicated by the thick black line indicates that the aggregated formula sequence and the "Revenue|Cost|Profit" super-pattern sequence generated in the previous step are now used in a drag&drop operation in the canvas for generating a super-super-pattern "Revenue|Cost|Profit|Aggregated". The first element of the "Aggregated" formula sequence is used as formula element representing said "Aggregated" formula sequence. The user may select the first element of the "Aggregated" formula sequence and drag it underneath the coherent block of cells representing a pattern element of the pattern sequence "Revenue|Cost|Profit" having been defined in accordance with the description of FIG. 11I, thereby creating a super-pattern "Revenue|Cost|Profit|Aggregated".

Once the first aggregated formula sequence element is "released", the implicitly and automatically generated super-super-pattern "Revenue|Cost|Profit|Aggregated" is applied on the canvas multiple times, thereby generating a list of super-super-pattern instances as depicted on the right side of FIG. 11J.

As can be inferred from FIG. 11, embodiments of the invention may allow a user to freely re-arrange elements of interdependent data and formula sequences without the need to manually correct any formula reference and/or cell formats or styles.

Figure 12A:
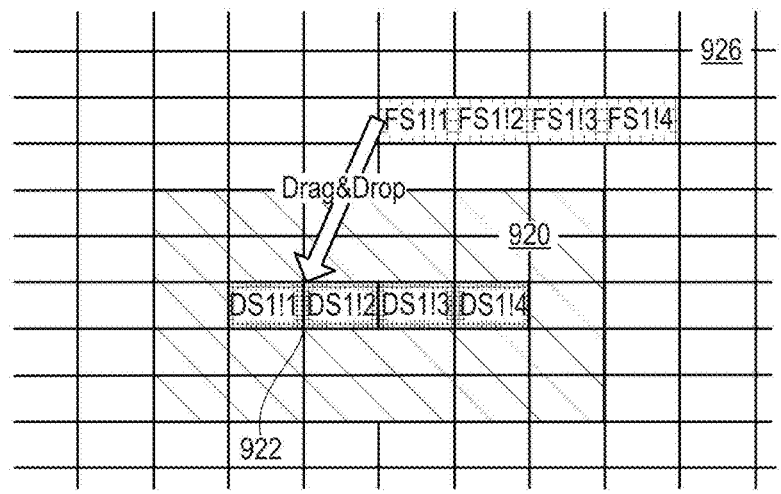
FIGS. 12a-12b depicts a canvas with a docking zone and a drag&drop based pattern definition.

FIG. 12A depicts a canvas 926 comprising a first horizontal block of four formula cells FS1!1 to FS1!4 and a second horizontal block of four cells DS1!1-DS1!4 comprising data values. Each block of cells may be surrounded by a docking zone 920 that may be highlighted in some embodiments. A docking zone is a predefined region around a block of canvas elements that triggers the creation and repeated application of a pattern in response to a user dropping an element of another cell block representing another data, formula or pattern sequence onto said region. The docking zone may be a grid that allows to freely position a selected canvas element in the grid via a gridline-snapping mechanism. In some embodiments, the whole canvas is segmented such that any canvas element acts as an element of a docking zone of its nearest cell block once a user has selected another cell for a drag&drop based pattern definition. In the depicted example, the four formula cells may comprise four formulas of a first formula sequence FS1 and the four data cells may comprise four data values of a first data sequence DS1. For example, the formula in FS1!1 may specify a formula referencing DS1!1 and multiply the data value contained therein by a particular factor, e.g. 3. The formula in FS1!2 may specify a formula referencing DS1!2 and multiply the data value contained therein by the particular factor. The formula in FS1!3 may specify a formula referencing DS1!3 and multiply the data value contained therein by the particular factor. The formula in FS1!4 may specify a formula referencing DS1!4 and multiply the data value contained therein by the particular factor.

When the user has selected a particular canvas element representing an element of a sequence in a "drag operation", e.g. the first element of sequence FS1, and moves the mouse over the docking zone and/or canvas cells representing elements of another sequence DS1 while keeping the element selected (e.g. while keeping the mouse button pressed), a mark 922 may appear. The mark may have the form of a thick or otherwise highlighted border or box and indicates a current docking position, i.e., a position relative to the element DS1!1 (representing the data sequence DS1) where the currently selected and dragged element would be placed if the mouse button was released at this moment.

Figure 12B:
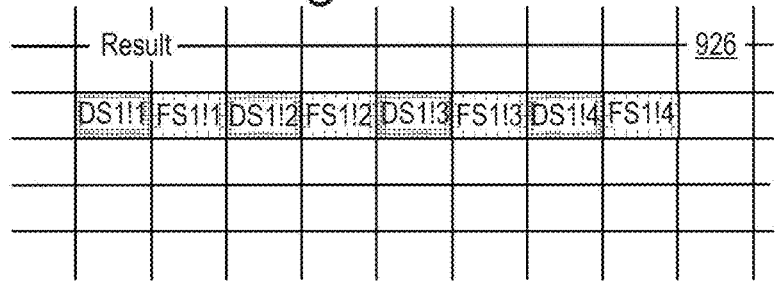

FIG. 12B depicts the result of the drag and drop operation of FIG. 12A: the user may have dropped the selected element FS1!1 at the docking position 922 highlighted in FIG. 12A. As a result, the element FS1!1 is inserted right and adjacent to the canvas element comprising the first element of the data sequence DS1. The canvas cell that previously comprised the formula FS!1 of the formula sequence FS1 is updated such that it is empty and looks like a default canvas cell. The drag&drop operation preferably does not only transfer the data or formula value but also the format of the canvas element to the new position. This drag/drop operation creates a pattern consisting of two elements: a data element representing the first element of the data sequence DS1 and, directly right to said data element, a formula element representing the first element of the formula sequence FS1.

After this pattern is defined, the pattern is applied four times and fully automatically onto the same canvas, thereby creating a pattern sequence [DS1!1|FS1!1][DS1!2|FS1!2][DS1!3|FS1!3][DS1!4|FS1!4] in the canvas. The format and relative positions of the canvas elements onto which the pattern was applied reproduces the format and relative positions of the pattern elements of the pattern [DS1|FS1] created in the drag&drop-based pattern definition process. Here, the pattern [DS1|FS1] is created manually by dragging the element FS1!1 next to a region in the docking zone of the element DS1!1 such that FS1!1 constitutes the right adjacent neighbor element to DS1!1.

Figure 13A:
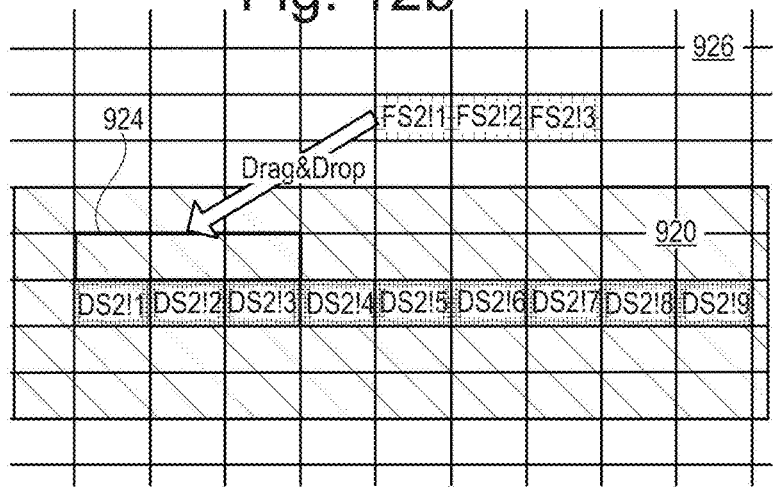
FIGS. 13a-13b depicts a canvas with a docking zone and another drag&drop based pattern definition.

FIG. 13A depicts a canvas 926 comprising a first horizontal block of three formula cells FS2!1 to FS2!3 and a second horizontal block of nine cells DS2!1-DS2!9 comprising data values. Each block of cells may be surrounded by a docking zone 920. In the depicted example, the four formula cells may comprise three formulas of a formula sequence FS2 and the nine data cells may comprise nine data values of a data sequence DS2. For example, the formula in FS2!1 may specify a sum of the data values contained in DS2!1 to DS2!3. The formula in FS2!2 may specify a sum of the data values contained in DS2!4 to DS2!6. The formula in FS2!3 may specify a sum of the data values contained in DS2!7 to DS2!9.

When the user selects the first element of sequence FS2 and moves the mouse over the docking zone and/or canvas cells representing elements of another sequence DS2 while keeping the element selected (e.g. while keeping the mouse button pressed), a mark 924 may appear that indicates a current docking position. In the depicted example, the mark 924 indicates a multi-canvas-element docking position that is aligned to three elements of the data sequence DS2. The mark 924 indicates the position relative to the data element DS2!1 (representing the data sequence DS2) where the currently selected and dragged element would be placed if the mouse button was released at this moment.

Figure 13B:
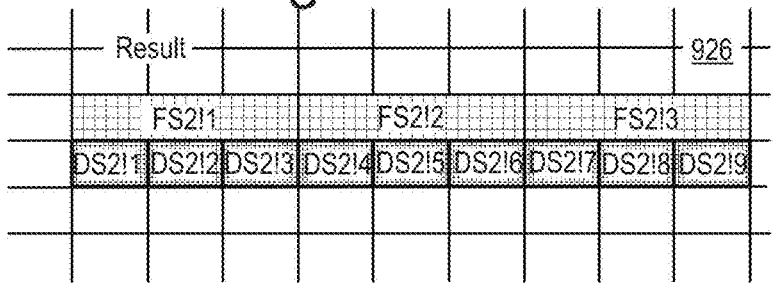

FIG. 13B depicts the result of the drag and drop operation of FIG. 13A: the user may have dropped the selected element FS2!1 at the docking position 924 highlighted in FIG. 13A. As a result, the element FS2!1 is inserted on top of and adjacent to the three canvas elements comprising the first, second and third elements of the data sequence DS2. This drag/drop operation creates a pattern consisting of four elements: three data elements respectively representing the data sequence DS2, but respectively corresponding to different offsets within the data sequence DS2 and, directly above to said three data elements, a formula element representing the first element of the formula sequence FS2.

After this pattern is defined, the pattern is applied multiple times and fully automatically onto the same canvas, thereby creating a pattern sequence [DS2!1|DS2!2|DS2!3|FS2!1] [DS2!4|DS2!5|DS2!6|FS2!2] [DS2!7|DS2!8|DS2!9|FS2!3] in the canvas. The format and relative positions of the canvas elements onto which the pattern was applied reproduces the format and relative positions of the pattern elements created in the drag&drop based pattern definition process. Here, the sequence element FS2!1 is dropped on three canvas elements being the upper, adjacent neighbor canvas elements of DS2!1, DS2!2, and DS2!3.

The invention claimed is:

1. A computer-implemented method of data processing control, the method comprising:
receiving one or more data sequences, each data sequence being a sequence of one or more data values;
receiving one or more formula sequences, each formula sequence being a sequence of one or more formulas, each formula comprising one or more references to one or more of the data values of one or more of the data sequences and comprising one or more operators which specify how the referenced data values are to be processed;
providing a GUI, the GUI enabling a user to define a pattern comprising at least one data element and at least one formula element, each data element representing one of the data sequences and each formula element representing one of the formula sequences, the GUI enabling the user to define the spatial relationship of the data elements and formula elements in the pattern,
applying the pattern on a canvas of an electronic document a first time, the application comprising:
mapping the data elements and formula elements of the pattern to elements of the canvas;
filling each of the canvas elements mapped to a data element with the data value of the data sequence represented by said data element,
filling each of the canvas elements mapped to a formula element with one of the formulas of the formula sequence represented by said formula element or with a result value computed by applying the formula to the one or more data values referenced by said formula;
repeatedly applying the pattern on the canvas, thereby mapping the elements of the pattern to further elements of the canvas and filling the further elements of the canvas with further ones of the data values of the one or more data sequences and with further ones of the formulas of the one or more formula sequences or their results until all data values of one of the data sequences or all formulas of one of the formula sequences have been filled once into the canvas.

2. The computer-implemented method of claim 1, the generation of the pattern comprising the user performing a drag-and-drop operation of the data element or the formula element for positioning the data element and the formula element at desired positions relative to each other.

3. The computer-implemented method of claim 1, the GUI and the canvas of the electronic document being separate graphical user interfaces.

4. The computer-implemented method of claim 1, the GUI that enables the user to define the pattern being the canvas of the electronic document or a selected region of the canvas of the electronic document, the at least one data element representing the data sequence in the pattern being a canvas element comprising the first data value of the data sequence, the at least one formula element representing the formula sequence in the pattern being a canvas element comprising the first formula of the formula sequence.

5. The computer-implemented method of claim 1, further comprising:
receiving, by the GUI, a pattern sequence as input, the GUI enabling the user to define a super-pattern, the super-pattern comprising at least one pattern element representing the pattern sequence and comprising the at least one data element or formula element, the GUI enabling the user to define the spatial relationship of the pattern element and the data elements or formula elements in the super-pattern.

6. The computer implemented method of claim 5, further comprising:
applying the super-pattern on a further canvas of the electronic document a first time, the application comprising:
mapping the data elements and formula elements of the super-pattern, including the data elements and formula elements of the pattern, to elements of the further canvas;
filling each of said canvas elements mapped to a data element with the data value of the data sequence represented by said data element,
filling each of said canvas elements mapped to a formula element with one of the formulas of the formula sequence represented by said formula element or with a result value computed by applying the formula to the one or more data values referenced by said formula;
repeatedly applying the super-pattern on the further canvas, thereby mapping the elements of the super-pattern, including the elements of the pattern, to further elements of the further canvas and filling the further elements of the canvas with further ones of the data values of the one or more data sequences and with further ones of the formulas of the one or more formula sequences or their results until all data values of one of the data sequences or all formulas of one of the formula sequences have been filled once into the further canvas.

7. The computer-implemented method of claim 1, the GUI comprising GUI elements enabling the user to define super-patterns comprising multiple pattern elements respectively representing a pattern sequence, the definition of the super-pattern comprising defining the spatial relationship of pattern elements and of data elements and formula elements, if any, within the super-pattern.

8. The computer-implemented method of claim 1, the canvas of the electronic document being a worksheet of a spreadsheet application or a sub-region thereof or a slide of a presentation application.

9. The computer-implemented method of claim 1, further comprising, before performing the filling of the canvas elements:
   automatically predicting the number of times the pattern will be applied given the length of the one or more data sequences and the length of the one or more formula sequences;
   using the predicted number and the size and shape of the pattern as input for automatically identifying all elements in the canvas that will be mapped to pattern elements of the pattern after having applied the pattern the predicted number of times; and
   outputting a warning message that data might be lost in case the identified elements in the canvas already comprise other content or locking the identified elements in the canvas such that manual editing of the identified cells is prohibited.

10. The computer-implemented method of claim 1, the GUI comprising GUI elements enabling a user to assign a respective cell format to each of the data elements and formula elements of the pattern, the GUI being configured for:
   assigning the cell format that has been entered by a user interacting with the GUI elements to respective pattern elements of the pattern,
each mapping of one of the elements of the pattern to a canvas element comprising:
   formatting said canvas elements in accordance with the cell format assigned to the pattern element that is mapped onto said canvas element.

11. The computer-implemented method of claim 1, further comprising:
   automatically generating an address for each data value of a data sequence, the address being a combination of a data sequence identifier of the data sequence comprising the data value and an offset, the offset identifying the position of the data value within the data sequence; or
   automatically generating an address for each formula of a formula sequence, the address being a combination of a formula sequence identifier of the formula sequence comprising the formula and an offset, the offset identifying the position of the formula within the formula sequence.

12. The computer-implemented method of claim 1, the pattern comprising at least two formula elements respectively representing the same one of the formula sequences or comprising at least two data elements respectively representing the same one of the data sequences.

13. The computer-implemented method of claim 1, the GUI comprising a display pane with a grid, the grid enabling the user to define the spatial relationship of data elements and formula elements to each other, each data element and formula element and each pattern element, if any, being freely positionable in the grid via a gridline-snapping mechanism.

14. The computer-implemented method of claim 1, further comprising:
   receiving the user's selection of one of the elements of the canvas to act as starting element;
   performing the repeated application of the pattern, thereby automatically filling, starting from the selected starting element, the canvas, the filling comprising:
      mapping a predefined pattern element of the pattern to the selected starting element;
      mapping all other pattern elements of the pattern to the other elements in the canvas in accordance with the relative position of pattern elements in the pattern and in accordance with a predefined or user-defined pattern application direction.

15. The computer-implemented method of claim 1, the method being implemented by an office application or a plug-in or add-on of an office application, wherein the office application is in particular a spreadsheet application.

16. The computer-implemented method of claim 1, the GUI further comprising a GUI element enabling the user to switch between three different view modes of the canvas of the electronic document, the three view modes comprising:
   a data view that displays in each of the canvas elements that is mapped to a formula element of the pattern the result returned by a respective formula of the formula sequence represented by said formula element;
   a formula view that displays in each of the canvas elements which is mapped to a formula element of the pattern an originally specified or extrapolated formula rather than a formula result;
   a minimalistic formula view that
      displays in each of the canvas elements which is filled with an originally specified formula said originally specified formula rather than a result provided by the formula; and
      that displays in each of the further canvas elements that is filled with an extrapolated formula a predefined visual element such that each of the further canvas elements does not show any formula or data value.

17. The computer-implemented method of claim 1, further comprising:
   receiving a user's selection of a first block of cells of a spreadsheet application, the first block of cells comprising data values, and using the data values in the selected first block as one of the one or more data sequences; or
   receiving a user's selection of a second block of cells of a spreadsheet application, the second block of cells comprising formulas, and using the formulas in the selected second block as one of the one or more formula sequences.

18. The computer-implemented method of claim 1, further comprising automatically generating one of the formula sequences, the generation comprising:
   receiving at least two specified formulas, each of the at least two formulas comprising one or more references to one or more of the data values of one or more of the data sequences and comprising one or more operators which specify how the referenced data values are to be processed;

automatically generating further formulas by extrapolating the references in said at least two specified formulas until an extrapolated reference would reference a data value not comprised in the one or more data sequences referenced by the two specified formulas;

using the at least two specified formulas and the further generated formulas as the one formula sequence.

19. The computer-implemented method of claim 18, the at least two specified formulas received in response to a user's selection of at least two canvas elements comprising the at least two specified formulas, the method further comprising:

automatically filling a sequence of other canvas elements adjacent to the at least two selected canvas elements with the generated further formulas, the automated filling being performed in response to the user's movement of the cursor over at least one of the other canvas elements while holding a mouse button pressed, the releasing of the mouse button triggering the filling of the other canvas elements with the generated further formulas comprising the extrapolated references.

20. The computer-implemented method of claim 18, the at least two specified formulas received by reading the at least two specified formulas from a configuration file or a database, the GUI comprising further GUI elements enabling the user for selecting the configuration file or a record of the database comprising the at least two specified formulas and for triggering the extrapolation of the at least two specified formulas for generating the one formula sequence.

21. The computer-implemented method of claim 19, further comprising:

selectively locking the other canvas elements comprising the generated further formulas for preventing the user from modifying any one of the generated further formulas.

22. The computer-implemented method of claim 19, the at least two specified formulas being a first formula contained in a first element of the canvas and a second formula contained in a second element of the canvas, the method further comprising:

selectively locking the second element of the canvas such that the user is selectively allowed to modify references contained in the second formula but is prevented from modifying other parts of the second formula.

23. The computer-implemented method of claim 19, the generation of the formula sequence and the application of the pattern on the data sequences and formula sequences being performed in parallel.

24. A computer system comprising:
a processor configured for:
receiving one or more data sequences, each data sequence being a sequence of one or more data values;

receiving one or more formula sequences, each formula sequence being a sequence of one or more formulas, each formula comprising one or more references to one or more of the data values of one or more of the data sequences and comprising one or more operators which specify how the referenced data values are to be processed;

providing a GUI, the GUI enabling a user to define a pattern comprising at least one data element and at least one formula element, each data element representing one of the data sequences and each formula element representing one of the formula sequences, the GUI enabling the user to define the spatial relationship of the data elements and formula elements in the pattern, applying the pattern on a canvas of an electronic document a first time, the application comprising:
mapping the data elements and formula elements of the pattern to elements of the canvas;
filling each of the canvas elements mapped to a data element with the data value of the data sequence represented by said data element,
filling each of the canvas elements mapped to a formula element with one of the formulas of the formula sequence represented by said formula element or with a result value computed by applying the formula to the one or more data values referenced by said formula;

repeatedly applying the pattern on the canvas, thereby mapping the elements of the pattern to further elements of the canvas and filling the further elements of the canvas with further ones of the data values of the one or more data sequences and with further ones of the formulas of the one or more formula sequences or their results until all data values of one of the data sequences or all formulas of one of the formula sequences have been filled once into the canvas;

a storage medium comprising, for each canvas element mapped to a formula element, a result value, the result value having been computed by applying the formula filled into said formula element on the one or more data values referenced by the formula, the result value being stored in association with the data values and the formula used for computing the result value; and a display configured for displaying the GUI and the canvas.

* * * * *